United States Patent
Theodore

(10) Patent No.: US 7,967,990 B2
(45) Date of Patent: Jun. 28, 2011

(54) HYBRID CHEMICAL/MECHANICAL DEWATERING METHOD FOR INACTIVATING AND REMOVING PHARMACEUTICALS AND OTHER CONTAMINANTS FROM WASTEWATER

(75) Inventor: Marcus G. Theodore, Salt Lake City, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 455 days.

(21) Appl. No.: 12/220,265

(22) Filed: Jul. 23, 2008

(65) Prior Publication Data
US 2008/0314827 A1  Dec. 25, 2008

Related U.S. Application Data

(63) Continuation-in-part of application No. 11/203,514, filed on Aug. 12, 2005, now Pat. No. 7,429,329.

(60) Provisional application No. 60/604,675, filed on Aug. 26, 2004.

(51) Int. Cl.
*C02F 1/62* (2006.01)
*C02F 1/70* (2006.01)
*C02F 1/72* (2006.01)

(52) U.S. Cl. ........ 210/709; 210/719; 210/721; 210/724; 210/747; 210/759; 210/906; 210/908; 210/912

(58) Field of Classification Search .................... 210/709
See application file for complete search history.

(56) References Cited

U.S. PATENT DOCUMENTS

| | | | | |
|---|---|---|---|---|
| 2,171,203 | A | * | 8/1939 | Urbain et al. ................. 210/717 |
| 4,224,148 | A | * | 9/1980 | Lindman et al. .............. 210/714 |
| 4,304,673 | A | | 12/1981 | Reynolds et al. |
| 4,340,489 | A | | 7/1982 | Adams et al. |
| 4,765,911 | A | | 8/1988 | Rasmussen |
| 5,158,686 | A | * | 10/1992 | Kigel ............................ 210/713 |
| 5,221,312 | A | | 6/1993 | Buhidar |
| 5,382,265 | A | | 1/1995 | Mower |
| 5,906,750 | A | | 5/1999 | Haase |
| 6,077,432 | A | | 6/2000 | Coppola et al. |
| 7,429,329 | B2 | * | 9/2008 | Theodore ...................... 210/607 |
| 7,662,294 | B1 | * | 2/2010 | Cox, Jr. ......................... 210/759 |
| 7,704,399 | B2 | * | 4/2010 | Condit .......................... 210/666 |
| 2006/0043025 | A1 | * | 3/2006 | Theodore ...................... 210/724 |

OTHER PUBLICATIONS

United Nations Environmental Programme Division of Technology, Industry, and Economics Newletter and Technical Publications Freshwater Management Series No. 1, "Bio-solids Management: An Environmentally Sound Approach for Managing Sewage Treatment Plant Sludge", Aug. 2005.
The 13th Element, John Wiley & Sons, Inc., New York, 2000 Chapter "Oh Shit", pp. 271-273.
Phosphorous: "from urine to fire" by Peter E. Childs; http://www.u1.ie/-CinA/Issue 63/TOC27 Phosphorous.htm Jul. 31, 2004.

(Continued)

*Primary Examiner* — Peter A Hruskoci
(74) *Attorney, Agent, or Firm* — Marcus G. Theodore

(57) ABSTRACT

A hybrid chemical/mechanical dewatering sewage treatment plant and method employing rapid sludge chemical dewatering technology in conjunction with slower conventional mechanical dewatering solids agglomeration and disposal methods to meet operating constraints and environmental permitting restrictions and siting limitations for disposal of sewage and wastewater.

14 Claims, 8 Drawing Sheets

Layout 2

OTHER PUBLICATIONS

Pharmaceuticals, Hormones, and Other Organic Wastewater Contaminants in US Streams, 1999-2000. A National Reconnaissance, Environ. Sci. Technol., 36(6). 1202-1211, Mar. 2002 by Dana W. Kolpin, US GS, et al.

A review of synergistic effect of phot catalysis and ozonation on wastewater Treatment by Agustina T.E. et al., Journal of photochemistry and photobiology Abstact.

Solid phas extraction and HPLC determination of veterinary pharmaceuticals in wastewater by Sandra Babic, et al., Abstract.

Welcome to Perchorate News.com; http://www.perchloratenews.com.

California and Sweden Sign Agreement to Jointly Develop Biomethane and Other Renewable Fuels at p. 5 of 21.

* cited by examiner

HYBRID CHEMICAL/MECHANICAL DEWATERING METHOD FOR INACTIVATING AND REMOVING PHARMACEUTICALS AND OTHER CONTAMINANTS FROM WASTEWATER

RELATED APPLICATIONS

This application is a continuation-in-part application of utility patent application Ser. No. 11/203,514, filed Aug. 12, 2005, now U.S. Pat. No. 7,429,329, entitled HYBRID CHEMICAL/MECHANICAL DEWATERING METHOD AND APPARATUS FOR SEWAGE TREATMENT PLANTS, which is a continuation-in-part application of Provisional Patent Application 60/604,675 filed Aug. 26, 2004 entitled "HYBRID CHEMICAL/MECHANICAL DEWATERING METHOD AND APPARATUS FOR SEWAGE TREATMENT PLANTS"

BACKGROUND OF THE INVENTION

1. Field

This invention comprises a hybrid chemical/mechanical dewatering method and apparatus for siting and constructing hybrid sewage treatment plants. More particularly, it relates to a sewage treatment plant and method employing rapid sludge chemical dewatering technology in conjunction with slower conventional mechanical dewatering solids agglomeration and disposal methods for inactivating and removing pharmaceuticals and other contaminants entering sewage treatment plants to meet environmental permitting restrictions and siting limitations for disposal of sewage and wastewater.

2. State of the Art

Various sewage treatment methods and plants are known. Most large municipal systems employ a series of settling ponds sequentially concentrating the solids contained in wastewater either with or without polymers for separation from liquids via mechanical separation means, such as belt presses. In order to produce a clean effluent that can be safely discharged to watercourses, wastewater treatment operations use three or four distinct stages of treatment to remove harmful contaminants; according to the United Nations Environmental Programme Division of Technology, Industry, and Economics Newsletter and Technical Publications Freshwater Management Series No. 1, "Biosolids Management: An Environmentally Sound Approach for Managing Sewage Treatment Plant Sludge" which goes on to say: "Each of these stages mimics and accelerates processes that occur in nature. Preliminary wastewater treatment usually involves gravity sedimentation of screened wastewater to remove settled solids. Half of the solids suspended in wastewater are removed through primary treatment. The residual material from this process is a concentrated suspension called primary sludge, which will undergo further treatment to become biosolids.

Secondary wastewater treatment is accomplished through a biological process, which removes biodegradable material. This treatment process uses microorganisms to consume dissolved and suspended organic matter, producing carbon dioxide and other by-products. The organic matter also provides nutrients needed to sustain the communities of microorganisms. As microorganisms feed, their density increases and they settle to the bottom of processing tanks, separated from the clarified water as a concentrated suspension called secondary sludge, biological sludge, waste activated sludge, or trickling filter humus. Significant amounts of carbon dioxide are released in the process.

Tertiary or advanced treatment is used when extremely high-quality effluent is required, such as direct discharge to a drinking water source. The solid residual collected through tertiary treatment consists mainly of chemicals added to clean the final effluent, which are reclaimed before discharge, and therefore not incorporated into biosolids.

Combined primary and secondary solids comprise the majority of material used at municipal plants for biosolids production. Careful management throughout the entire treatment process allows plant operators to control the solids content, nutrient value and other constituents of biosolids.

The Municipal Sludge-to-Biosolids Treatment Process

There are three important factors to be addressed through further processing before this material can be utilized: (1) pathogen levels, (2) presence of potentially harmful industrial contaminants, and (3) water content.

The principal process employed to convert municipal sludge into biosolids is called stabilization Stabilization accelerates the biodegradation of organic compounds, reduces the microbial population including pathogens, and renders the material microbiologically safe for agricultural use. Biological stabilization uses aerobic or anaerobic treatment to reduce the organic content of solids through controlled biodegradation. Waste digesters also convert solids into usable biomethane. The gas produces consists of 50-80% methane, 20-50% carbon dioxide, and trace levels of other gases such as hydrogen, carbon monoxide, nitrogen, oxygen, and hydrogen sulfide; see California and Sweden Sign Agreement to Jointly Develop Biomethane and other Renewable Fuels, http://www.cogeneration.net/waste digester.htm, at page 5.

Chemical stabilization does not reduce the quantity of biodegradable organic matter in solids, but creates process conditions that inhibit microorganisms, thereby slowing the degradation of organic materials and reducing odors and CO2 emissions. The most common chemical stabilization procedure is to elevate the pH level of the solids using lime or other alkaline materials. Thermal drying and composting can also be used to stabilize biosolids. Full pasteurization of biosolids is not needed when the primary use is cropland application. Any potential risk to human health due to exposure to pathogens is eliminated through proper application procedures and in-situ microbial decomposition.

The presence of contaminants in the sludge or biosolids arising from industrial discharges or pharmaceutical chemicals is a more challenging problem and may be the deciding factor in determining the choice of a utilization disposal option. Put simply, many industries have habitually used the sewer system as a convenient and low-cost way to discharge hazardous wastes. Other chemicals, such as perchlorates from the dissolution of ammonium, potassium, magnesium, or sodium salts, or the unburned byproducts of rocket engine ignition and air bags work into the ground water. Pharmaceutical users similarly dispose of surplus medicines and birth control pills in the same manner, or indirectly pass said pharmaceuticals contained in their waste entering the system. The contaminants accumulate in the biomass and sludge, and can render the material unfit for any beneficial use. The most common options used for disposal of this contaminated material are landfill or incinerations, the cost of which is usually borne by the municipality rather than the hazardous waste generator. Biosolids utilization is a good, environmentally sustainable option when the wastewater is from municipal sources only with limited pharmaceutical concentrations, or when a fully enforced industrial pre-treatment and discharge control system is in place. The decision to select an environmentally sustainable approach to biosolids management can be used very effectively to review and correct point source polluting practices up-stream that should not be taking place.

The final concern is the water content of the product. Primary and secondary wastewater generally contains no more than four percent solids, and the storage and transportation costs of this semi-liquid material limit the application to nearby farmland. Processes to remove water from solids, therefore, are common in biosolids production. The simplest method for removing water is gravity thickening, which involves concentration by simple sedimentation. Allowing sufficient time for solids to settle in tanks can increase suspended solids concentration to five or six percent. Thickening can also include flotation processes, gravity drainage belts, perforated rotating drums, and centrifuges. Nothing is added to biosolids during the gravity thickening processes.

Dewatering is another standard method of water removal in biosolids production. Simple dewatering involves containment of wastewater solids in drying beds or lagoons, where gravity, drainage, and evaporation remove moisture. More often, dewatering involves mechanical equipment such as filter presses, vacuum filters, and centrifuges. Mechanically dewatered solids typically contain between 20% and 45% solids. Finally, drying processes can be used to remove even larger volumes of water from biosolids. Thermal drying with direct or indirect dryers followed by polarization can remove virtually all water and stabilize biosolids to the point of full compliance with any regulatory requirement. This method is used where there is a viable commercial market for the pelletized product, and energy costs are not significant.

Thus a particular wastewater treatment facility design is highly dependent upon the wastewater inflows and sludge composition and the discharge and treatment permitting restrictions and plant objectives. Oftentimes these plant designs employ thermophilic and other digestion processes to break down the sludge as part of the separation process. For example, Haase, U.S. Pat. No. 5,906,750, issued May 25, 1999 discloses a method for dewatering of sludge that has been digested by a thermophilic digestion process employing polymers. The polymers are extremely hydrophilic as they agglomerate fine particles for separation from the wastewater in the belt presses. This gelatinous mechanically separated mass is then usually land filled or admixed with other fuels for burning, and may contain significant pathogens and heavy metals. Once deposited and covered, these landfills do not breakdown rapidly. They comprise large deposits of unstable gelatinous soil, which acts as a breading ground for pathogens, contains heavy metals, and pharmaceuticals. If these separated solids are treated with chlorine for pathogen kill, chlorinated carcinogens often result creating a different environmental hazard.

The mechanically separated gray water by-product is usually not treated and is then used for agricultural application, or dumped into a body of water for dilution. If treated with chlorine to kill pathogens before land application or dumping, its usage for agricultural purposes is lost as chlorine acts as an herbicide.

In addition, mechanical sludge separation typically requires a large series of settling ponds with wastewater residence times therein typically from 24 to 48 hours, depending upon the weather and nature of the sludge processed. Typically, landfill and polymer costs comprise approximately 30 percent of the wastewater treatment costs.

As long as a mechanical sewage separation plant operates within its environmental discharge and landfill permit constraints, it provides a low operating and maintenance cost effective sewage disposal method but requires significant upfront capital investment and may result in long term environmental clean-up costs. As urban populations being served grow, and landfill costs increase, these plants seldom meet permitting constraints without significant upgrades in design, particularly with respect to pathogen gray water discharge and the negative impacts caused by mountains of gelatinous solids. In addition, testing methods now identify pharmaceuticals and other chemicals in the wastewater, which were not previously addressed in a treatment plant's design and discharge permits. Plant expansions therefore require new permits, which must address these identified pharmaceuticals and chemical compounds.

Other chemical wastewater treatment methods employ chemical agglomeration and disposal methods, such as Adams et al., U.S. Pat. No. 4,340,489, issued Jul. 20, 1982, wherein wastewater is treated with sufficient sulfurous acid to effectuate solids separation and disinfection, while providing higher quality water. Reynolds et. al, U.S. Pat. No. 4,304,673, issued Dec. 8, 1981 is another wastewater treatment process employing chemicals to continuously disinfect sewage sludge in a similar manner as Adams et al. Rasmussen, U.S. Pat. No. 4,765,911, issued Aug. 23, 1988 is another two-stage chemical treatment process for treating aerobic or anaerobic sewage sludge. These chemical wastewater treatment methods provide disinfected separated solids to form a metal-free fertilizer, which must be disposed of or sold. These chemical treatment methods take less space resulting in lower upfront capital costs, but are more expensive to operate than mechanical separation methods, and require special arrangements with respect to chemical handling and safety. They also require post discharge treatment of the treated wastewater streams to meet environmental and land application requirements.

Wastewater solids disposal land application methods are limited by landfill space, and heavy metal and pathogen contamination. Buhidar, U.S. Pat. No. 5,221,312, issued Jun. 22, 1993 is an example of a chemical wastewater treatment method wherein the chemically treated wastewater heavy metals are removed and pathogens killed before land application.

Where areas for land application are not available, burning or other disposal methods are required. Because of the high water content of mechanically concentrated sludge, only approximately 15% of the separated sewage sludge can be admixed with coal or coke for efficient burning in fluidized beds. To remove the high water content, various heated oil drying processes and mechanical separation methods have been employed. These mechanical densification methods reduce the moisture content, but are capital intensive and generally require significant heat and energy costs. Gasification is an alternative to burning concentrated sludge, but its efficiencies due to the high moisture content of mechanically concentrated sludge are presently not acceptable as the fuel drying costs outweigh the by-product fuel benefits.

Another problem with burning biomass is EPA air emission regulations controlling the mass burning of sludge. One of the more egregious air pollutants emitted from the burning of mechanically concentrated sludge with high sulfur coal or other fuels are dioxides of sulfur (SOx). High sulfur coal of between 2 and 4% by weight sulfur must be scrubbed, or burned with low sulfur coal (under 2% by weight sulfur) or other low sulfur fuels to produce a combined fuel with air emissions under 2% by weight. In addition, $CO_2$ emissions from treatment plant digesters can now be quantified as a point emitter source.

Lastly, pharmaceuticals, perchlorates, and other chemicals must be addressed. The article, *Pharmaceuticals, Hormones, and Other Organic Wastewater Contaminants in U.S. Streams, 1999-2000: A National Reconnaissance, Environ. Sci. Technol.,* 36 (6), 1202-1211, March 2 by Dana W. Kolpin, U.S. Geological Survey, 400 S. Clinton Street, Box 1230, Iowa City, Iowa 52244 Edward T. Furlong U.S. Geological Survey, Box 25046, MS 407, Denver, Colo. 80225-0046; Michael T. Meyer U.S. Geological Survey, 4500 SW 40th Avenue, Ocala, Fla. 34474; E. Michael Thurman U.S. Geological Survey, 4821 Quail Crest Place, Lawrence, Kans. 66049; Steven D. Zaugg U.S. Geological Survey, Box 25046, MS 407, Denver, Colo. 80225-0046; Larry B. Barber U.S. Geological Survey, 3215 Marine Street, Boulder, Colo. 80303; Herbert T. Buxton U.S. Geological Survey, 810 Bear Tavern Road, West Trenton, N.J. 08628 provided the first nationwide reconnaissance of the occurrence of pharmaceuticals, hormones, and other organic wastewater contaminants (OWCs) in water resources. The U.S. Geological Survey used five newly developed analytical methods to measure concentrations of 95 OWCs in water samples from a network of 139 streams across 30 states during 1999 and 2000. The selection of sampling sites was biased toward streams susceptible to contamination (i.e. downstream of intense urbanization and livestock production). OWCs were prevalent during this study, being found in 80% of the streams sampled. The compounds detected represent a wide range of residential, industrial, and agricultural origins and uses with 82 of the 95 OWCs being found during this study. The most frequently detected compounds were coprostanol (fecal steroid), cholesterol (plant and animal steroid), N,N-diethyltoluamide (insect repellant), caffeine (stimulant), triclosan (antimicrobial disinfectant), tri (2-chloroethyl) phosphate (fire retardant), and 4-nonylphenol (nonionic detergent metabolite). Measured concentrations for this study were generally low and rarely exceeded drinking-water guidelines, drinking-water health advisories, or aquatic-life criteria. Many compounds, however, do not have such guidelines established. The detection of multiple OWCs was common for this study, with a median of seven and as many as 38 OWCs being found in a given water sample. Little is known about the potential interactive effects (such as synergistic or antagonistic toxicity) that may occur from complex mixtures of OWCs in the environment. In addition, results of this study demonstrate the importance of obtaining data on metabolites to fully understand not only the fate and transport of OWCs in the hydrologic system but also their ultimate overall effect on human health and the environment.

One way of dealing with these organic compounds is photo catalysis discussed in the article entitled "A review of synergistic effect of photo catalysis and ozonation on wastewater treatment", by AGUSTINA T. E.; ANG H. M.; VAREEK V. K., Journal of photochemistry and photobiology. C, Photochemistry reviews ISSN 1389-5567, the abstract of which states:

For the treatment of wastewater that contain recalcitrant organic compounds, such as organo-halogens, organic pesticides, surfactants, and colouring matters, wastewater engineers are now required to develop advanced treatment processes. A promising way to perform the mineralization of this type of substance is the application of an advanced oxidation process (AOP). Photocatalytic oxidation and ozonation appear to be the most popular treatment technologies compared with other advanced oxidation processes (AOPs) as shown by the large amount of information available in the literature. The principal mechanism of AOPs function is the generation of highly reactive free radicals. Consequently, combination of two or more AOPs expectedly enhances free radical generation, which eventually leads to higher oxidation rates. The use of combine photo catalysis and ozonation is an attractive route because of the enhancement of the performance for both agents by means of the hydroxyl radical generation, a powerful oxidant agent that can oxidize completely the organic matter present in the aqueous system. The scope of this paper is to review recently published work in the field of integrated photo catalysis and ozonation on wastewater treatment. In this review the chemical effects of various variables on the rate of degradation of different pollutants are discussed. The mechanism and kinetics has also been reported. It can be concluded that photocatalytic oxidation in the presence of ozone is a process that is qualitatively and quantitatively different from the well-known photocatalytic oxidation with oxygen and the ozonation without photocatalyst. The reason for the higher oxidation rate is probably a photocatalytic induced decay of ozone, initiated by the combination of titanium dioxide and UV-A radiation.

These photo catalysis and ozonation chemicals are difficult to incorporate into a conventional wastewater treatment plant, and therefore are usually applied as a tertiary treatment process of the wastewater plant's treated effluent.

Where the point emitter source of these pharmaceuticals is known, they may be removed by solid phase extraction (SPE) using an ion exchange, such as the Oasis HLB extraction cartridge; see "Solid phase extraction and HPLC determination of veterinary pharmaceuticals in wastewater" by Sandra Babic, Danijela Asperger, Dragana Mutavdzic, Alka J. M. Horvat, and Marija Kastelan-Macan; Laboratory of Analytical Chemistry, Faculty of Chemical Engineering and Technology; University of Zagreb published in Volume 70, Issue 4, dated Nov. 15, 2006, pages 732-738 in a collection of papers presented at the first worship of the European Union: Analysis and Removal of Contaminants from Wastewaters for the Implementation of the Water Framework Directive— $1^{st}$ EMCO 2005. As point source emissions are often unknown, this pretreatment method prior to entering a wastewater treatment system is often unfeasible.

Similarly, according to the article "Welcome to Perchlorate News.com, an online newsletter with up-to-the-minute news and information about the treatment of Perchlorate contamination in water,"

"Perchlorate ($ClO_4^-$) is an anion that originates as a contaminant in ground water and surface waters from the dissolution of ammonium, potassium, magnesium, or sodium salts. There have been large volumes of perchlorate being disposed of since the 1950's and perchlorate has been detected in at least 14 states, every state having a confirmed perchlorate manufacturer or user. In 2001 the EPA began requirement for monitoring this contaminant in the nation's drinking water and in 2002 the US EPA submitted a proposed reference dose of 1 part-per-billion (ppb) for perchlorate in drinking water based on perceived changes in infant rat brain structure at a dose equivalent to 300 ppb for a 150 pound human adult or as low as 45 ppb for a bottle-fed infant. Regulatory pressures to reduce perchlorate concentrations in surface and ground water have been increasing. The EPA has set a provisional action level for drinking water of 32 $\mu g/L$ (ppb) and more states have also established provisional levels, including California, Texas, Nevada and Arizona, with those of California and Nevada currently the most stringent, at 18 $\mu g/L$ (ppb)."

Coppola et al., U.S. Pat. No. 6,077,432 issued Jun. 20, 2000 provides a method for biodegradation of ammonium perchlorate, nitrate, hydrolysates, and other energetic materials utilizing at least one micro aerobic reactor containing a mixed bacterial culture. This process requires significant residence time in large reactor vessels.

Mower, U.S. Pat. No. 5,382,265 issued Jan. 17, 1995 discloses another perchlorate removal process using a stripping tower to concentrate the perchlorates. Potassium chloride is added to the concentrated perchlorate solution to form potassium perchlorate, which is cooled to effect crystallization of the potassium perchlorate removed by centrifuge or filer press. This process is energy intensive, involving a number of concentration separation steps difficult to control.

Thus there remains a need for a method and apparatus, which combines the advantages of both chemical and mechanical sewage treatment to meet environmental sewage disposal requirements, plant objectives, and community preferences. The hybrid method and apparatus described below provides such an invention.

SUMMARY OF THE INVENTION

The present invention comprises a hybrid chemical/mechanical dewatering sewage treatment method and apparatus for conventional mechanically dewatered treatment plants having wastewater inflows and mechanically treated water outflows which can also be chemically dewatered to meet the permitting and community sewage disposal objectives.

Method

The method comprises determining if the wastewater inflows entering the conventional mechanical dewatering sewage treatment plant can be chemically dewatered to separate solids from the wastewater stream. Chemical dewatering consists of injecting sulfur dioxide into the wastewater stream and observing if the wastewater changes color from a green tint to a brown tint, and the solids self agglomerate and begin to separate and change colors from a dark brown to a light brown color. These self agglomerated solids do not stick to separating equipment and filters. Next, a portion of the wastewater stream inflows and/or mechanically concentrated wastewater sludge flows is diverted for chemically dewatering based on at least one of the following factors:

i. treatment costs,
  ii. budget constraints for expansion,
  iii. the present plant capacity to handle future treatment demands,
  iv. eutrophication discharge requirements,
  v. increased environmental treatment discharge requirements,
  vi. changes in the composition of the treatment plant inflows,
  vii. landfill capacity constraints,
  viii. energy heat requirements of any drying beds,
  ix. community aesthetic preferences,
  x. time of construction required to construct facilities to meet additional treatment capacity required,
  xi. treated water quality required for sale or discharge,
  xii. concentrated sludge water content required for disposal,
  xii. odor, heavy metal and pathogen p requirements,
  xiv. chemical treatment wastewater water/solids separation times,
  xv. evaporation losses
  xvi. treatment plant $CO_2$ emissions reductions required;
  xvii. pharmaceuticals, hormones, and other organic wastewater contaminants (OWCs) present in the wastewater,
  xviii. Perchlorates and chlorates present in the wastewater. The diverted portion of the wastewater inflows and/or sludge flows is then chemically treated to separate the solids from the wastewater. The chemically separated solids are then disposed of utilizing the existing sewage plant disposal unit processes and/or in accordance with sewage treatment plant disposal discharge requirements. The chemically treated water is disposed of consistent with the sewage treatment plant discharge permits and/or reinjecting into a segment of the existing sewage treatment plant treatment processes such that any conventional aerobic and anaerobic digesters are bypassed to prevent the killing of helpful bacteria within the digesters.

The above costs and benefits include any savings from economies of scale resulting from expanded usage of underutilized segments of the existing facility. These optimal utilization costs are blended with the chemical treatment costs to determine the net costs of expanding the existing sewage treatment plant using both chemical and mechanical technologies. Thus, the benefits of both technologies are employed and construction and land costs minimized, while maintaining any of the existing facility's back-up reserve capacity.

The preferred chemicals for chemical dewatering are anhydrous or hydrous sulfur dioxide or any similar reacting chemicals, which provide rapid water/solids separation. Sulfur dioxide dissolves readily in water requiring little mixing. Chemical separation of wastewater and dewatering of the resultant solids typically takes 20 minutes to an hour compared to 24 and 48 hours with mechanical separation. The size of the treatment tanks is therefore materially less so land usage is minimized. Chemically treated wastewater methods provide greater flexibility in equipment separation designs, which result in further cost savings. Nor is there any need for adding polymers to agglomerate first the solids as is the case with conventional belt presses and centrifugal or mechanical separators used in conventional mechanical sewage treatment plants, providing additional cost savings.

Material handling costs are also reduced. Sulfur dioxide treatment generates initial separated solids having a water content of 30% to 40%. If the chemical exposure is extended to insure disinfection, odor generation during the remainder of the treatment and disposal process is minimized as discussed in more detail below. Sulfur dioxide also acid leaches the heavy metals into the liquid fraction for ease of removal via the subsequent addition of lime.

Sulfur dioxide chemical dewatering also generates self-agglomerating solids, which can be more readily separated from the liquid fraction via conventional screens or drying beds.

This rapid chemical injection and separation generating self-agglomerating solids and heavy metals in the liquid fraction enables the use of much smaller gas injection and separation equipment than conventional mechanical dewatering systems. The chemical dewatering equipment can be installed in modules, as needed. Thus, chemical dewatering requires lower capital equipment investment, with comparable or somewhat higher handling costs. When combined with the higher capital equipment investment and lower handling costs of a conventional plant provides, it generates an overall blended wastewater treatment cost, which is comparable to or lower than conventional mechanical separation treatment costs alone.

Anhydrous and hydrous sulfur dioxides are strong disinfectants. When employed, they disinfect the liquids and solids to provide solids storage without the emissions of odors. Sulfur dioxide is relatively cheap and readily available. It may also be generated on-site from the burning of raw sulfur, particularly if additional heat from sulfur burning is required for solids process drying. It is extremely hydrophilic and forms sulfurous acid on contact with water. Injection until an elevated pH of approximately 2 for approximately 30 minutes results in complete disinfection; see Adams et al., U.S. Pat. No. 4,340,489.

After the initial solids separation, the sulfur dioxide treated solids have a moisture content of 30% to 40% and continue to shed water for approximately 24 hours, ultimately reaching the consistency and dryness of wood with a 1 to 4 percent by weight water content. This dried product may then be land filled, burned, or gasified in a manner consistent with the treatment plant unit processes and/or permit constraints.

The hybrid chemical/mechanical dewatering sewage treatment method and apparatus is expanded as needed and thus avoids the mechanically concentrated carrying costs of constructed excess capacity to meet projected future needs.

For example, the typical operating and maintenance costs and investment costs of a conventional mechanically dewatered sewage treatment plant for the type of plant shown in FIG. 1 has a cost of $26.3 million, a $139,000/year annual maintenance cost, and an annual operating cost of $419,000/year. This 10 MGD plant expansion, if operated at full capacity provides low $/MGD operating costs resulting from large volume wastewater treatment economies of scale. Unfortunately, often the anticipated expansion volume for a given plant is only 0.5 to 1 MGD per year, taking years to build up sufficient treatment volume to provide optimal treatment costs based on economies of scale. The excess carrying capacity for 20 years under this scenario results in very high upfront overall treatment costs, when the cost of installation is factored in.

In addition, it takes three years to construct this type of conventional facility so is that construction must start before the actual additional capacity is required, causing additional carrying costs.

Applicant's hybrid method provides a combination mechanical/chemical dewatering wastewater treatment solution to provide incremental wastewater treatment as needed. Chemical dewatering equipment has a much lower installation cost, which can be leased or installed on a pay as you go basis. For example, instead of the $26,500,000 price for a 10 MGD conventional plant, a $2,000,000 modular unit may be added to the existing footprint to provide a 0.5 to 1 MGD hybrid chemical dewatering system as needed to the existing plant. Additional 0.5 to 1 MGD modules may then be installed as needed.

The concentrated solids are then disposed of in accordance with the plant's existing processing units and permitting requirements—for example, for those plants land filling treated solids, such as the Central Valley Water Reclamation Facility in Salt Lake City, Utah, landfill is used for disposal. For this facility, the water content of its mechanically generated solids is typically 40% by weight. Employing chemical dewatering results in a 4% by weight composition to provide a net 36% by weight savings. With chemical dewatering its present typical disposal costs of approximately $32.00/ton would be similarly reduced 36%. In addition, the reduced volume of treated solids extends the life of the present landfill facility. Other savings from chemical dewatering result from avoiding the costs polymers employed in more expensive conventional treatment plants, which typically average 9 pounds per ton of processed sludge as well as the reduced use of its belt presses. Off-setting these cost savings are the added costs of sulfur dioxide. The amount of SO2 is dependent upon the alkalinity of the wastewater, which generally is no more than 800 mg/liter (Standard Methods, 14$^{th}$ Ed. APHA, 1975); see Reynolds, U.S. Pat. No. 4,304,673. Reynolds found that generally no more than 2000, and preferably no more than about 600 mg of SO2 per liter of wastewater was required. Using 1 liter equals 0.2641721 gallons and 1 mg=1/1000 gr., 1 gr.=2.204623×10−3 pounds; for a 0.5 MGD plant this equals:

0.5×1,000,000 gallons/day×1 liter/0.2641721 gallons× 2000 mg/liter×1 gr/1000 mg×0.26417212 gallons/liter× 2.204623×10−3 pounds/gram=2,204.6229 pounds/day or approximately 1 ton of sulfur dioxide. Current sulfur dioxide pricing in dollars per ton of liquid bulk f.o.b. works currently is around $230/ton so that chemical cost is relatively nominal. This sulfur dioxide may be delivered to the site in tanks, or generated on site via sulfur burners. Sulfur burners are relatively efficient and have the additional benefit of generating considerable heat from sulfur burning, which can be used to supply heat to the treatment plants drying beds.

In areas where eutrophication is a problem, the heavy metals can be removed from the treatment wastewater stream via the addition of CaO or hydrated lime before discharge. This not only precipitates heavy metals as metal hydroxides, but some insoluble calcium phosphates, which are then removed via belt presses and sold or land filled. The demetalized, low phosphate treated water is then mixed with the plant's treated water discharge stream to dilute the same for sale or land application. If eutrophication is not a problem, the acidified sulfurous acid wastewater can be added to the wastewater plant discharge to remove chlorine before finally releasing the treated wastewater, thus saving the cost of adding further sulfur dioxide for dechlorinization.

The hybrid chemical/mechanical dewatering sewage treatment method is thus employed in a manner to consistent with the conventional treatment plant. Where solids are land filled, the chemically separated solids are land filled. If the existing treatment plant burns or gasifies separated solids, the chemically separated solids are similarly burned or gasified.

The hybrid chemical/mechanical dewatering sewage treatment method preferably is operated to optimize the existing treatment plant to avoid stranded costs. Removal of the heavy metals from the chemically treated water via alkalization precipitation to precipitate heavy metals and phosphates for removal is therefore employed by adding the metal and phosphate reduced chemically treated water to the mechanically separated wastewater stream for dilution to comply with plant discharge requirements or sale. If the conventional wastewater treatment plant removes heavy metals via electrolysis, the chemically treated water is preferably similarly treated to precipitate heavy metals contained therein for removal, and the demetalized chemically treated water then added to the mechanically separated wastewater stream to dilute its heavy metal content. This optimization approach eliminates the need to modify the plants various discharge and treatment permits.

For example, where the conventional wastewater treatment plant sells its treated water, the hybrid chemical/mechanical dewatering sewage treatment method has its chemically treated water pH adjusted to precipitate heavy metals contained therein for removal, and the demetalized chemically treated water is then adjusted to meet its water content requirements for similar sale and reuse.

Most wastewater treatment plants have dominant siting and permit constraints, which dictate the amount of chemical dewatering required. If this is not the case because of numerous competing siting and permitting constraints and factors, the hybrid chemical/mechanical dewatering sewage treatment method often employs a computer and software to determine the optimal portion of wastewater to be diverted for chemical dewatering. This is determined by assembling and inputting into a computer a database consisting of:
  i. the present conventional wastewater treatment plant processing capabilities, its quantity and quality of discharge process water, sludge production, pathogen content, and landfill requirements,
  ii. the operating costs of mechanically concentrating and dewatering sludge,
  iii. the permitting constraints of disposing of sludge, wastewater discharge, and remediation requirements,
  iv. siting constraints on expanding an existing facility, and wastewater inflow concentrations and content.

A comparable database of the chemical concentration and dewatering costs to meet the expansion needs of the plant to meet current permitting objectives, the added revenues from sales of treated water, the avoidance of landfill costs and other benefits associated with chemical concentration and dewatering costs is then assembled and inputted into the computer along with a program projecting the net costs to meet the expansion needs using chemically dewatering methods. A calculation program is then inputted into the computer projecting the net costs of expanding the existing sewage treatment plant using similar existing mechanical methods, and off-setting revenues vs. the net costs of expanding the existing sewage treatment plant using existing mechanical technology in combination with the net costs of chemical concentration and dewatering costs to provide for the expansion need. Based on the net cost comparisons, a combined system employing both mechanical and chemical concentration and dewatering technology is selected and designed to provide a blended wastewater treatment system for this expansion need within permitting constraints.

Generally the hybrid chemical/mechanical dewatering sewage treatment method databases also include:
  i. the BTU content of sludge mechanically concentrated at the proposed site, its water content, and concentration, handling, environmental compliance, and disposal costs,
  ii. the BTU content of sludge chemically dewatered at the proposed site, its water content, and concentration, handling, environmental compliance, and disposal costs,
  iii. the cost per BTU to generate fuel gas from mechanically concentrated sludge,
  iv. the cost per BTU to generate fuel gas from chemically dewatered sludge,
  v. gas delivery and clean-up costs, and
  vi. the environmental operating restrictions and requirements to operate a gasifier processing sludge mechanically concentrated versus chemically concentrated.

The computer program then selects the most cost effective percentages of chemical and mechanical separated sludge for gas production within permitting and siting requirements.

In addition, this hybrid chemical/mechanical dewatering sewage treatment method database for gasification generally includes any off-setting revenues from chemically dewatered sludge water sales and mechanically concentrated sludge water sales before selecting the most cost effective sludge concentration and gas production method. Also added to the databases are any standby backup charges for retaining a portion of the existing sewage treatment plant in reserve before selecting the most cost effective sludge concentration and gas production method.

The hybrid chemical/mechanical dewatering sewage treatment method databases may also include any off-setting soil conditioning benefits associated with chemical dewatering of sewage before selecting the most cost effective sludge concentration and gas production method. This is particularly important in alkaline soil regions where the additions of acids to soils is routinely required, thus providing an additional revenue stream to be factored in against the plant costs. This water conditioning removes chlorine as a side benefit; thereby further aiding in plant growth.

Probably the most critical factor in employing the hybrid chemical/mechanical dewatering sewage treatment method is adding to the database community preference values in terms of weighted benefits or costs reflecting the environmental benefits derived from chemical odor suppression, removal of heavy metals, pathogen kill, and a reduced footprint plant size. This subjective factor may be quantified and reflected in zoning or permitting constraints compliance costs assigned to govern the present mechanical sewage treatment plant. These community values change over time as suburbs expand around a sewage treatment plant Open lagoons, once acceptable, have become a severe property devaluation factor as large homes surround the sewage ponds. In addition, these sewage ponds attract birds and other insects, which can spread disease or interfere with incoming flights near airports. Hence a community may place a premium on smaller sewage treatment expansion units, thereby adding weighting factors to the databases dictating the selection of chemical dewatering systems, which only require 20 to 30 minute dwell time as opposed to 24 to 48 hours settling ponds. This reduces the reaction vessel sizing by a factor of 50 to 100 times resulting in a smaller expansion footprint.

Apparatus

The apparatus for hybrid chemical/mechanical dewatering sewage which can be both mechanically and chemically dewatered, generally comprises a conventional mechanically dewatered treatment plant having dewatering means to mechanically separate wastewater solids from wastewater inflows. Means for diverting for chemical dewatering a portion of conventional mechanically dewatered wastewater inflows, such as a stream splitter, are then incorporated. The stream splitter is preferably adjustable to divert differing portions of wastewater inflows. The stream splitter diverts a portion of conventional mechanically dewatered wastewater inflow streams and/or mechanically dewatered solids for chemical dewatering, from greater than 0% and up to 100% based on at least one of the following factors:
  i. treatment costs,
  ii. budget and site constraints for expansion,
  iii. the present plant capacity to handle future treatment demands,
  iv. eutrophication discharge requirements,
  v. increased environmental treatment discharge requirements,
  vi. changes in the composition of the treatment plant inflows,
  vii. landfill capacity constraints,
  viii. energy process heat requirements,
  ix. community aesthetic preferences,
  x. time of construction required to construct facilities to meet additional treatment capacity required,
  xi. treated water quality required for sale or discharge, and
  xii. concentrated sludge water content required for disposal,
  xiii. odor, heavy metal and pathogen process requirements,
  xiv. chemical treatment wastewater water/solids separation times,
  xv. evaporation losses,
  xvi. treatment plant $CO_2$ emissions reductions required;

xvii. pharmaceuticals, hormones, and other organic wastewater contaminants (OWCs) present in the wastewater,
xviii. perchlorates and chlorates and other inorganic chemical species present in the wastewater.

It is associated with means for chemically treating the diverted portion of the wastewater inflows to separate the solids from the wastewater, such as an SO2 gas injection system (a sulfonator) holding the chemically treated wastewater into a reaction zone until the desired water/solids separation occurs. Means for separating and disposing of the chemically separated solids, such as screens or drying beds are then employed to remove the solids for land filling or drying the same for use as a fuel or gasification. The chemically separated solids may be admixed with mechanically separated solids in a ratio, which provides a combined fuel with reduced overall moisture content than that of the mechanically separated solids. Generally, the means to convert the chemically separated solids into fuel are the on-site existing conventional mechanically dewatered gasification equipment and electrical generation equipment. However, smaller mobile equipment may be employed to only address the solids generated by the chemically dewatered system where this gasification and electrical generation equipment is not available.

Where heavy metals must be removed from the wastewater, means to pH adjust the chemically treated water to precipitate heavy metals contained therein is included for removal. This usually is a liming chamber where lime or hydrated lime is added to precipitate metal hydroxides and calcium phosphates for removal via mechanical separators, such as belt presses. However, other means to separate heavy metals precipitate from the demetalized chemically treated water for disposal may be included such as adding ferric chloride to precipitate the metals. This leaves a metal free chemically treated wastewater, which is combined with the mechanically separated wastewater streams to provide a blended diluted composition so their heavy metals content will not cause eutrophication if discharged into a stream or open water.

Means for disposing of the chemically treated water, such as water reinjection or blending apparatus of the chemically treated water with the conventional mechanically dewatered wastewater discharge are then included. The demetalized chemically treated water is generally added to the mechanically separated wastewater stream to dilute its heavy metal content before discharge where the percentage concentration of the plant discharge must be improved. Alternatively, the pH adjusted chemically treated water with the heavy metals removed may be sold for reuse. The separated heavy metal hydroxide precipitate may then be sold for reuse.

The means for diverting for chemical dewatering a portion of conventional mechanically dewatered wastewater inflow stream and/or mechanically dewatered solids is adjustable to periodically adjust the proportion of inflow stream for chemically dewatering to meet changing plant operating factors.

The hybrid chemical/mechanical dewatering sewage treatment method and equipment also inactivates and removes pharmaceuticals and other contaminants in wastewater inflow streams and/or conventional wastewater treatment plant process liquid streams. This is accomplished by diverting and oxygenating a portion of the wastewater inflow streams and/or conventional process liquid streams, if they have not been previously oxygenated, to oxidize those chemical species, which are inactivated by oxidation. The diverted portion may be of the entire intake or process flow or a lesser amount (greater than 0% and up to 100%), Into the diverted portion is injected $SO_2$ at a pH that generates sufficient sulfurous acid with free $SO_2$ to condition solids and wastewater for disinfection, separation, and to deodorize the separated wastewater inflows, and suppress $CO_2$ emissions and destroy those chemical species, which are inactivated by sulfurous acid reduction. This is preferably accomplished by running the wastewater through a sulfurous acid generator to deliver sulfur dioxide as needed.

The sulfur dioxide treated wastewater is then held in the same vessel into which the sulfur dioxide was injected, or a separate detention vessel, at a pH between approximately 1.5 and 4.5, depending upon dwell time, until at least one of the following occur:
i. a conditioned wastewater is produced where suspended solids agglomerate and dewater by shedding water upon separation and drying,
ii. dissolved solids and ammonia are sulfurous acid treated resulting in odor reduction,
iii. $CO_2$ microbial production ceases,
iv. required effluent disinfection occurs to meet disinfection discharge permit limits,
v. perchlorate, chlorate, and other chemical species present in the wastewater, which have not previously been inactivated by contact with carbon in the solids, are inactivated by sulfurous acid reduction.

The destruction of odor causing microbes feeding on the wastewater stops further $CO_2$ production, and may be employed where the wastewater treatment plant is mandated to reduce these carbon dioxide emissions. Also, if there is significant carbon in the suspended solids, most perchlorates and chlorates will have been reduced on contact with the solids. The separation and disposal of the solids also removes most of the adsorbed microbes. Under this scenario, the sulfur dioxide reduction treatment is more for acidification, inactivating certain chemicals susceptible to acid reduction, adding sulfurous and sulfate ions, and chemical dewatering of the solids. For example, tests at the Saticoy-Jose Florez Wastewater Treatment Plant at Saticoy, Calif. indicated that the treated effluent undergoing sulfur dioxide treatment had fecal coliforms <2 MPN. This disinfection level is suitable in California for gray water land application. Consequently, the sulfur dioxide was used primarily to acid reduce pharmaceuticals, and condition the solids and separated wastewater for land application.

Any solids are then mechanically separated and disposed of from the wastewater inflow streams and/or conventional process liquid streams from its chemically treated liquid fraction in accordance with a wastewater treatment plant's disposal permit requirements. Preferably, these are burned or gasified, if there are significant pharmaceuticals contained therein.

The pH of the chemically treated liquid fraction is then raised sufficiently to inactivate chemicals that are inactivated by a pH in excess of 8. This also precipitates metal hydroxides for subsequent filtration removal.

The pH of the chemically treated liquid fraction for discharge is then lowered to that required by the wastewater treatment plant's discharge permit requirements.

The chemically treated liquid fraction may be tested to identify any remaining pharmaceuticals and chemical contaminants remaining in the chemically treated liquid fraction. If found, appropriate reducing and oxidizing agents are added to inactive them. These added reducing and oxidizing agents are then removed by repeating the above method steps. One preferred oxidizing agent is hydrogen peroxide, which may be added to the chemically treated liquid fraction in a manner to inactivate any remaining chemicals, which require added oxidation for inactivation. A preferred reducing agent is ferrous chloride, which provides a ferrous ion solution is added to the chemically treated liquid fraction to inactivate any remaining chemicals, which require added reduction for inactivation. As these added oxidizing and reducing agents are extremely powerful and result in additional inactivation products, the concentrations of any remaining pharmaceutical and chemical species must justify the additional treatment.

Advantages

Pharmaceuticals and Chemical Removal

The treatment plant and method discussed above employing rapid sludge chemical dewatering technology in conjunction with slower conventional mechanical dewatering solids agglomeration and disposal methods inactivates and removes pharmaceuticals and other contaminants entering sewage treatment plants via oxidation reduction, acidification and alkalization before final pH adjustment to meet environmental permitting restrictions and siting limitations for disposal of sewage and wastewater.

Water Savings

Besides the blended cost and expedited installation advantages discussed above, another advantage of the hybrid chemical/mechanical dewatering sewage treatment apparatus for wastewaters is its reduced process water loss. Chemically dewatered sludge processes are much faster than conventional mechanical dewatering systems so evaporation losses are reduced. Conventional mechanical concentration systems are most successful in areas where the excess wastewater is evaporated into the atmosphere in hotter more arid regions. Unfortunately, this evaporative consumptive use of water in arid regions is now becoming a conservation issue. Presently on the Jordan River system in Salt Lake City, Utah, various sewage treatment plants are seeking to claim water rights to the treated waters exiting their plants and divert and sell the same to different water drainages to off-set costs. These water right claims for the first time in Utah will indirectly establish the cost of evaporative consumptive use of water related to sewage treatment operations so that evaporated lost water now becomes a cost of operations. Not only is water lost through evaporation, but the high water content in the land filled sewage must also be factored in. Hence, future mechanical concentration wastewater treatment systems must factor in the lost process water consumption as a cost in evaluating the best sewage treatment mode as the volume entering the plant and leaving the plant is easily quantifiable and affects future water right claims.

Additional off-setting revenues from higher quality chemically dewatered sludge water sales blended with mechanically concentrated sludge waters also result from this hybrid treatment. The additional water generated often provides sufficient extra water for surplus water sales while still maintaining the minimal flows to satisfy the water rights claims of downriver users and habitat enhancements. This avoids water treatment operating dictates from downriver users who have vested rights.

Eutrophication

Other environmental clean-up advantages may be factored in employing a hybrid chemical/mechanical dewatering system, such as addressing eutrophication impacts of algae bloom. Present mechanical concentration methods have focused on banning phosphate detergent usage, and removing phosphates from farm, and industrial sources entering wastewater streams before discharge to prevent eutrophication. These phosphate removal costs are significant, and fail to factor in the eutrophication impacts of heavy metals. The Swedish Phosphate Report concluded that removal from phosphates from detergents was pointless and ill advised. Water pollution was a far more complex problem than early environmental activists had assumed and it was proven to depend on a variety of factors, among which phosphate was perhaps one of the least important. The main cause was demonstrated to be industrial pollution by heavy metals, oils and insecticides, as all these substances kill the zooplankton that feed on the algae causing the problem; see *The 13$^{th}$ Element*, by John Emsley. John Wiley & Sons. 2000, at page 273. Chapter "Oh Shit". The removal of heavy metals and some phosphates by the hybrid chemical, mechanical dewatering system thus results in significant environmental benefits.

Synergy Efficiencies

Combining the chemical concentration and dewatering processes meeting the expansion needs of a conventional mechanical sewage treatment plant often exceeds compliance with current permitting discharge requirements. A removal of heavy metals and phosphates, sales of tertiary water, reduced landfill costs and other benefits associated with chemical concentration and dewatering not only provide cost savings, but better the overall sewage treatment plant off-site environmental impacts. For example, treating a portion of the wastewater input stream with sulfur dioxide, acid leaches heavy metals from the human sludge into the treated wastewater. These are then readily removed by increasing the pH to separate the metal hydroxides as a cake for landfill; see "Phosphorous: from urine to fire", by Peter E. Childs; http://www.ul.ie/~CinA/Issue 63/TOC27_Phosphorous.htm where approximately 24% of the phosphate in water in Europe is derived from human sewage. Combining the chemically treated polished water with the mechanically dewatered sludge wastewater discharge results in an improved plant wastewater discharge. Similarly, the drier solids take less volume when disposed of in the existing mechanical dewatered treatment plant extending the life of the existing landfill.

Fuel

Most mechanical dewatering methods generally produce sludges with high water content as outlined above. Low percentages of this high water content sludge are then admixed with conventional fuels, such as coal, for burning or gasification because of the high water content. Alternatively, they must first be further dewatered via drying beds and dryers, which add to the processing costs. Generally, it has been found that these mechanical dewatered sludge seldom have enough independent fuel value or usage on-site by smaller facilities and must be disposed of using other methods, such as land filling or admixing with other fuels for burning.

Conversely, chemically dewatered sludge is produced by injecting either gaseous SO2 or aqueous SO2 (sulfurous acid) to provide self adhering solids, which shed water to produce a dried solid with low water content and a relatively high BTU low sulfur concentrated fuel suitable for burning or gasification to produce heat, electricity, or other forms of useful energy, such as steam. The term "chemically dewatered" thus refers to an $SO_2$ treated sludge, which forms agglomerated solids, which self adhere and shed water to drain significantly more than conventional sludges to produce a dry solid of the approximate consistency of wood. When used as a fuel, it has a fairly consistent BTU content dependent upon the raw product composition. For example, one chemically treated and separated sludge generated near Logan, Utah produced a chemically dewatered densified fuel having BTU content similar to wood of between approximately 7,040 BTU/lb. ASTM (American Society Testing Method) 02382 and 7,290 BTU/lb. ASTM 02382. The BTU analysis of chemically dewatered densified fuel taken from the Montalvo Municipal Improvement District in Ventura, Calif. tested at 6091 BTU/lb., dry weight. The total moisture content of this chemically dewatered Montalvo sludge was 7.3% by wt. %, which is significantly less that the typical polymer separated sludges of between 40% to 80% by wt. % moisture—resulting in an almost 30 to 70% by weight haulage disposal savings.

Initial separation takes place in one half hour after injection of gaseous SO2 with a 30% to 40% moisture content, which continued to dry over a 24 hour period to a moisture content of between 4% to 6%. This chemically treated sludge had the appearance, and texture similar to dark dry wood, and was essentially odorless with a moisture content of between 4% and 6%, and a high cellulose solids content of between 94% and 96% similar to wood making them readily transportable and storable until burned or gasified. This dry wood like sludge had approximately 1.8% by weight SO2 emissions, when burned, which is comparable to those produced by low sulfur coal. Depending upon the fat content of the solids in the wastewater, the treated solids may have even a higher BTU content than wood. Consequently, the by-product fuel of chemically concentrated sludge may be burned directly, and/or admixed with the mechanically separated sludge for burning or gasification.

Soil Conditioning

In arid regions where alkaline soils are often found, the hybrid chemical and mechanical dewatering method for optimizing sewage treatment plants may generate acidified wastewater discharge to provide soil conditioning benefits, which reduce nutrient and water agricultural demands by making the soil more porous. In addition, instead of removing chemicals via competing membrane technologies, a balance chemical composition is generated with this hybrid chemical/mechanical dewatering of wastewater method, thus providing, an revenue source for this land conditioning method.

Community Preferences

Intangible aesthetic factors often drive the selection of a sewage treatment technology in those areas abutting urban development. The hybrid method for optimizing sewage treatment plants therefore may include adding to the database community preference values in terms of added benefits or costs for the environmental benefits derived from chemical odor suppression, removal of heavy metals, pathogen kill, and reduced site size as opposed to mechanical sludge concentration before selecting the most cost effective sludge concentration and gas production method. Although these aesthetic factors are often subjective, they are often the controlling force for community permitting compliance. As they also vary over time, chemical dewatering of a greater portion of the wastewater influent may be required

Permitting

Employment of chemical dewatering techniques in an existing conventional mechanical dewatering wastewater treatment plants avoids the necessity of seeking zoning changes, and a number of wastewater treatment and discharge permits. Construction is thus expedited, and the overall plant efficiencies improved within existing grand fathered discharge and treatment requirements. Where required, existing permitting constraints can often be bettered via the removal of heavy metals and reduction in size of the expanded plant footprint to meet additional incoming wastewater loads. The hybrid chemical/mechanical dewatering sewage treatment method for conventional mechanically dewatered treatment plants thus provides a plant, which meets or exceeds permit constraints.

Summary

The hybrid method for optimizing sewage treatment plants thus employs chemical and mechanical separation and treatment techniques in combination to comply with community environmental permitting and budgetary constraints in a manner heretofore unavailable.

DESCRIPTION OF THE ILLUSTRATED EMBODIMENTS

The design of a wastewater sewage treatment plant is largely a result of the composition of the influent wastewater to be treated and the permitting constraints regarding the treated effluent. Cost factors are significant, but other local requirements often dictate the ultimate plan design.

Cost

The following example illustrates the hybrid chemical/mechanical dewatering plant is cost competitive. There is a marked similarity of wastewater overall composition. Various models have been designed to aid in the preliminary design and cost estimating for wastewater treatment plant construction projects. CapdetWorks produced by Hydromantis, Inc., consulting engineers of Ontario, Canada is one such model. It is an update of the CAPDET model developed by the U.S. Army Corps or Engineers for the U.S. EPA to facilitate the evaluation of wastewater treatment alternatives based on life cycle costs and the degree of treatment provided.

Figure 1:
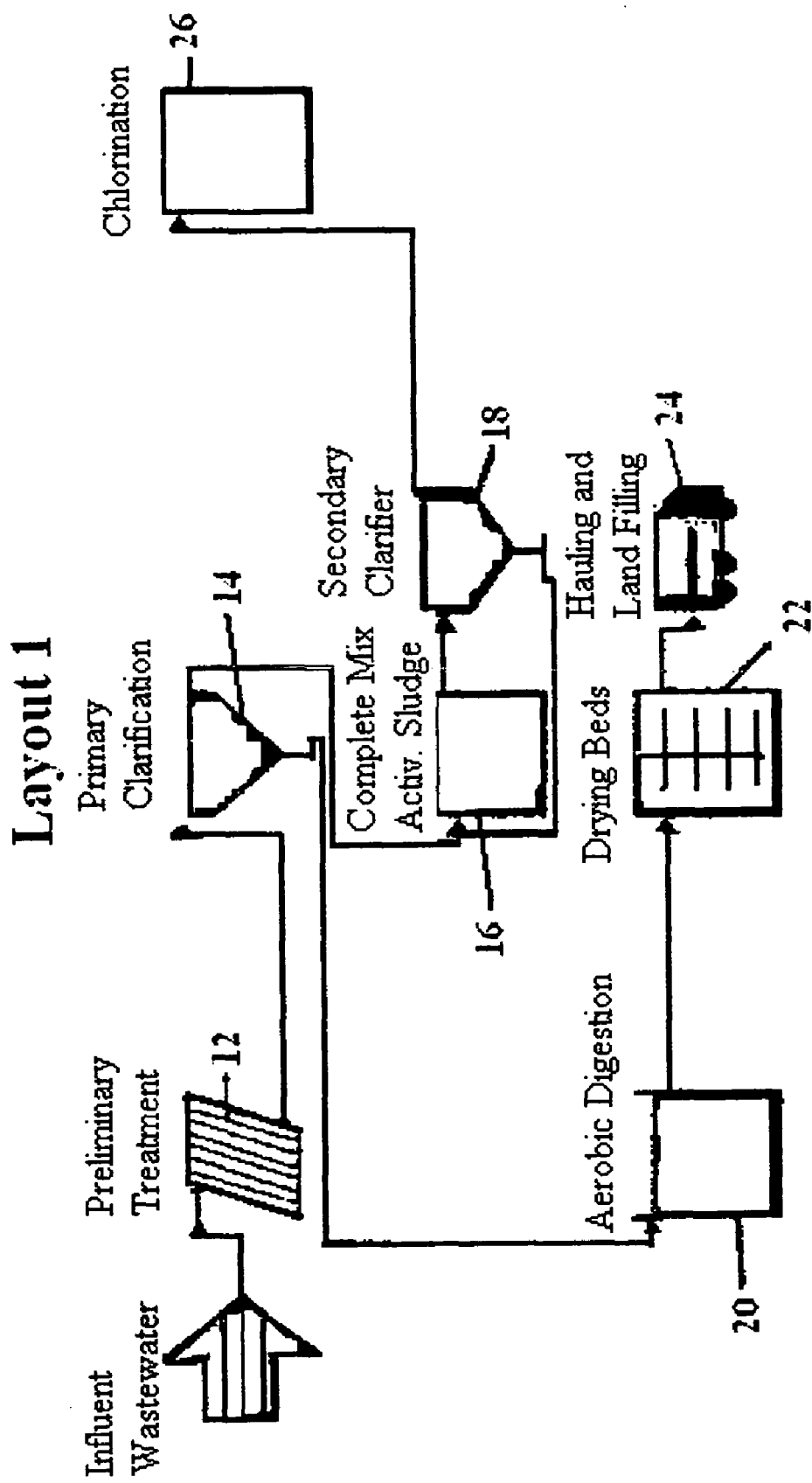
FIG. 1 illustrates a conventional mechanical sludge concentration wastewater treatment plant.

FIG. 1 illustrates a conventional mechanical sludge concentration wastewater treatment plant 10 produced by CapdetWorks. The example cited assumes a medium composition of untreated influent wastewater as follows:

|  | Influent | Effluent | Units |
| --- | --- | --- | --- |
| Max Flow | 10 | 10 | MGD |
| Min Flow | 10 | 10 | MGD |
| Suspended Solids | 220 | 220 | mg/l |
| % volatile solids | 75% | 75% | % |
| BOD | 220 | 220 | mg/l |
| Soluble BOD | 80 | 80 | mg/l |
| COD | 500 | 500 | mg/l |
| Soluble COD | 300 | 300 | mg/l |
| TKN | 40 | 40 | mgN/l |
| Soluble TKN | 28 | 28 | mgN/l |
| Ammonia | 25 | 25 | mgN/l |
| Nitrite | 0 | 0 | mgN/l |
| Nitrate | 0 | 0 | mgN/l |
| Total Phosphorous | 8 | 8 | mgP/l |
| pH | 7.6 | 7.6 |  |
| Cat ions | 160 | 160 | mg/l |
| Anions | 160 | 160 | mg/l |
| Settleable Solids | 10 | 10 | mL/L |
| Oil & grease | 100 | 100 | mL/L |
| Summer Temp. | 23 | 23 | deg. C. |
| Winter Temp | 10 | 10 | deg. C. |

Figure 2:
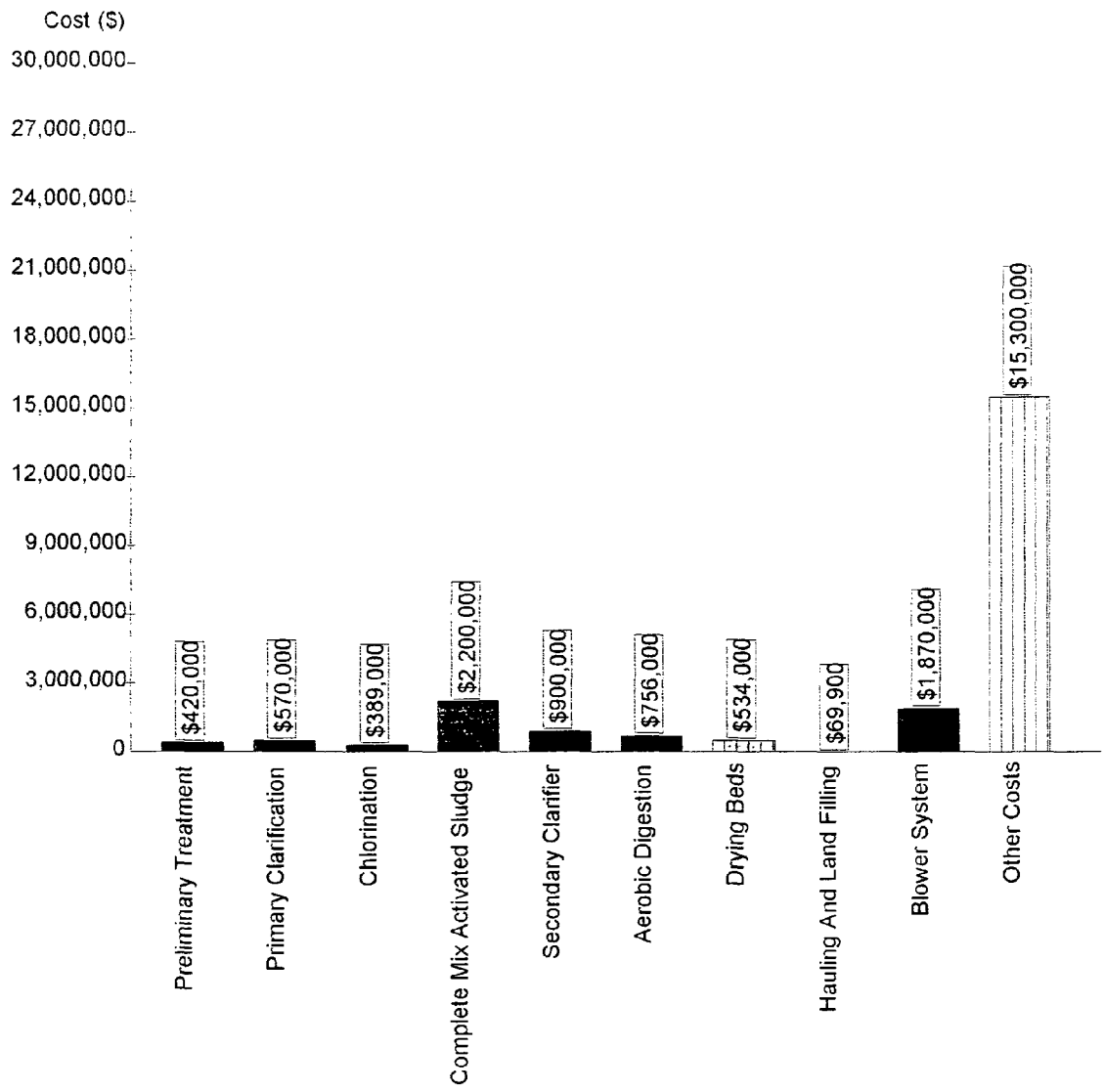
FIG. 2 is a chart of the typical cost of construction of the wastewater treatment plant described in FIG. 1.
Figure 3:
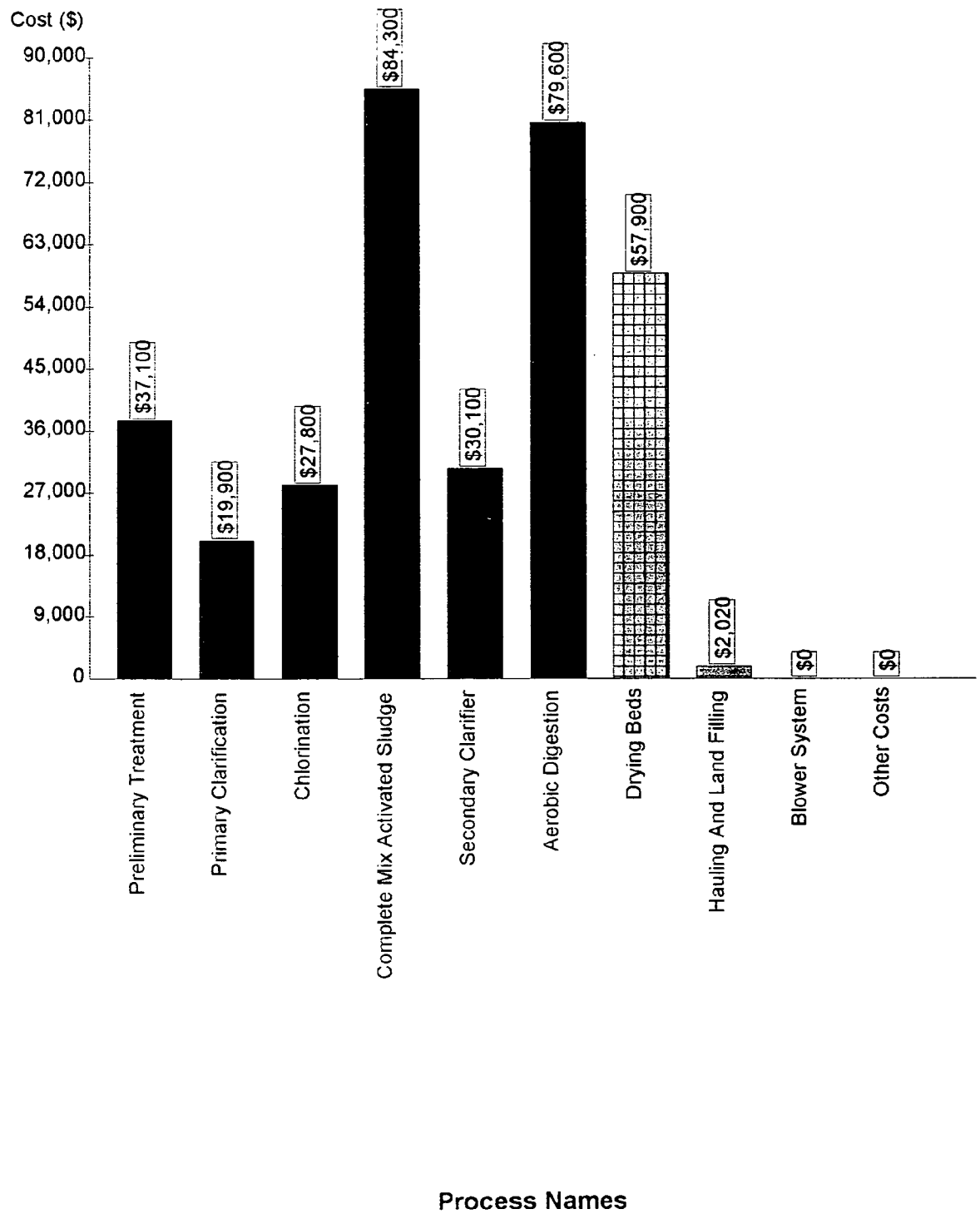
FIG. 3 is a chart of the typical operational costs of the wastewater treatment plant described in FIG. 1.
Figure 4:
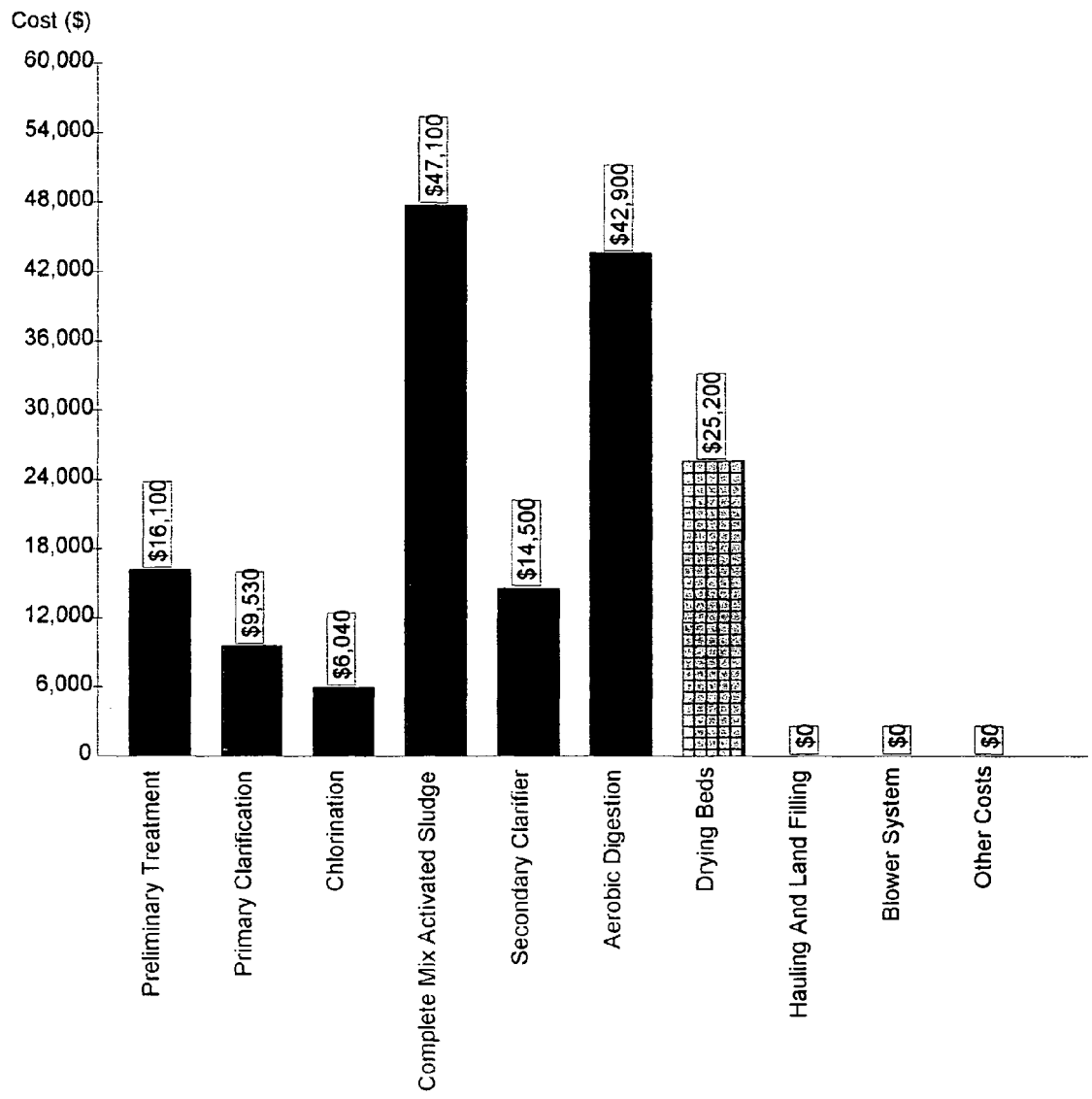
FIG. 4 is a chart of the typical maintenance costs of the wastewater treatment plant described in FIG. 1.

The above influent wastewater inflows are preliminarily screened with bar screens 12 before entering a primary clarifier 14. The primary clarifier 14 directs solids into a complete mix activated chamber 16 associated with a secondary clarifier 18. The mechanically separated solids are then sent to an anaerobic digester 20 for further concentration before disposal into drying beds 22 where the solids are further dried before hauling to a landfill 24. The water liquids from the secondary clarifier 18 are sent to the chlorinator 26 for treatment before discharge. The construction costs of this 10 MGD conventional treatment plant shown in FIG. 1 is $26,300,000 as broken down in FIG. 2. It has a three year construction time, and $419,000/year annual operation costs described in FIG. 3, and $139,000/year annual maintenance costs broken down in FIG. 4.

Figure 5:
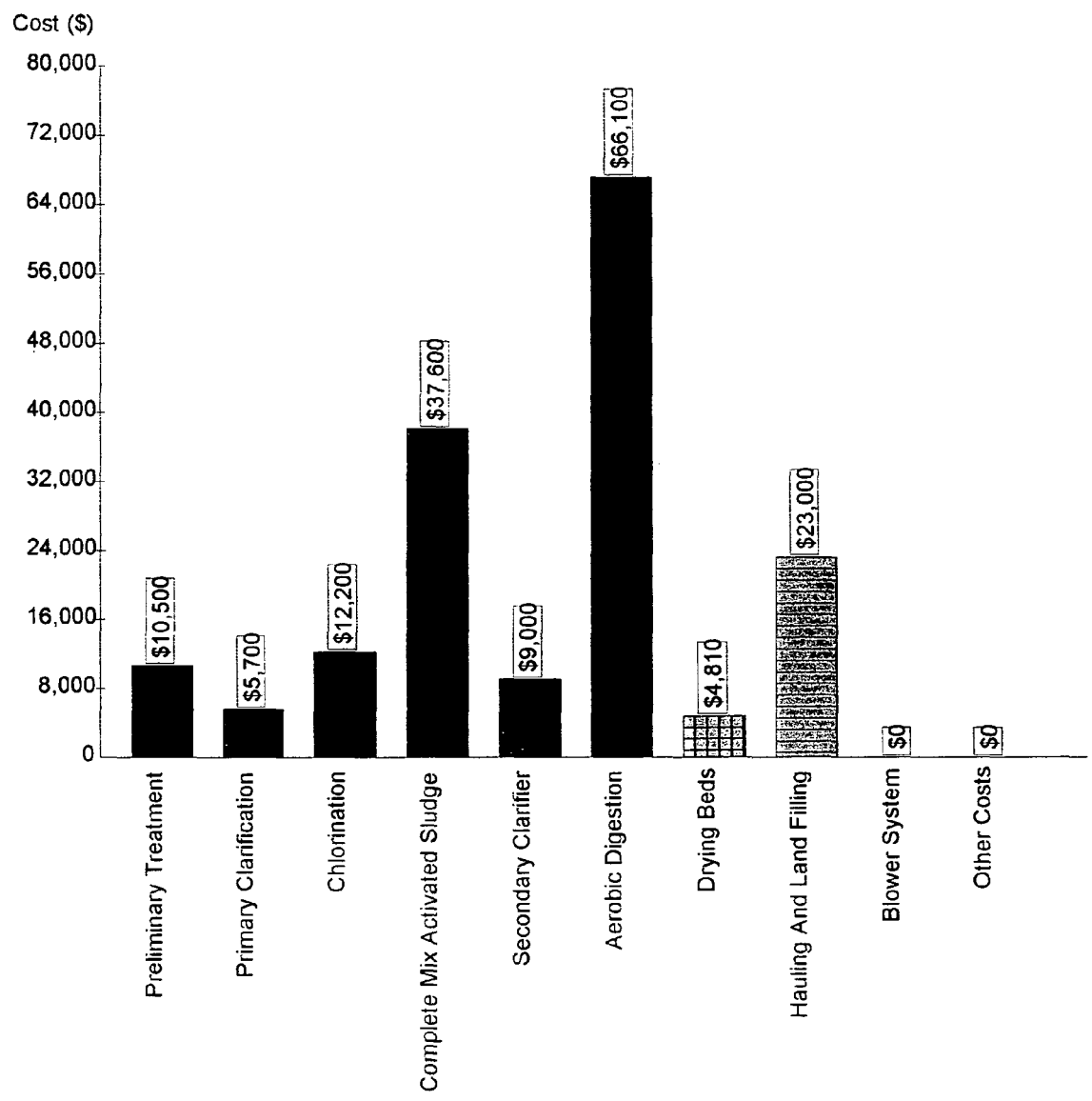
FIG. 5 is a chart of the typical material costs of the wastewater treatment plant described in FIG. 1.

FIG. 5 is a chart of the typical material costs of the wastewater treatment plant described in FIG. 1.

Figure 6:
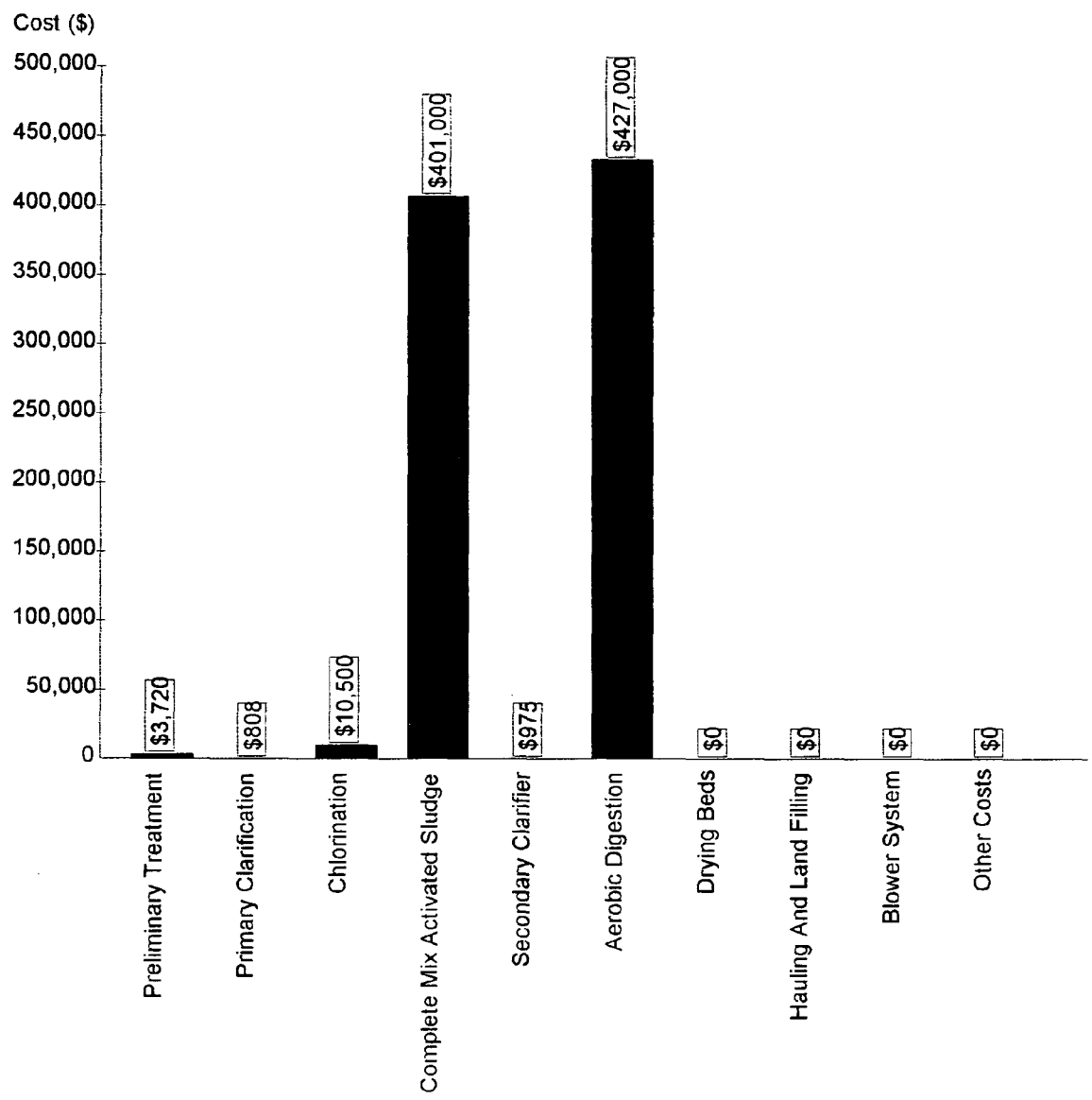
FIG. 6 is a chart of the typical energy costs of the wastewater treatment plant described in FIG. 1.

FIG. 6 is a chart of the typical energy costs of the wastewater treatment plant described in FIG. 1.

Figure 7:
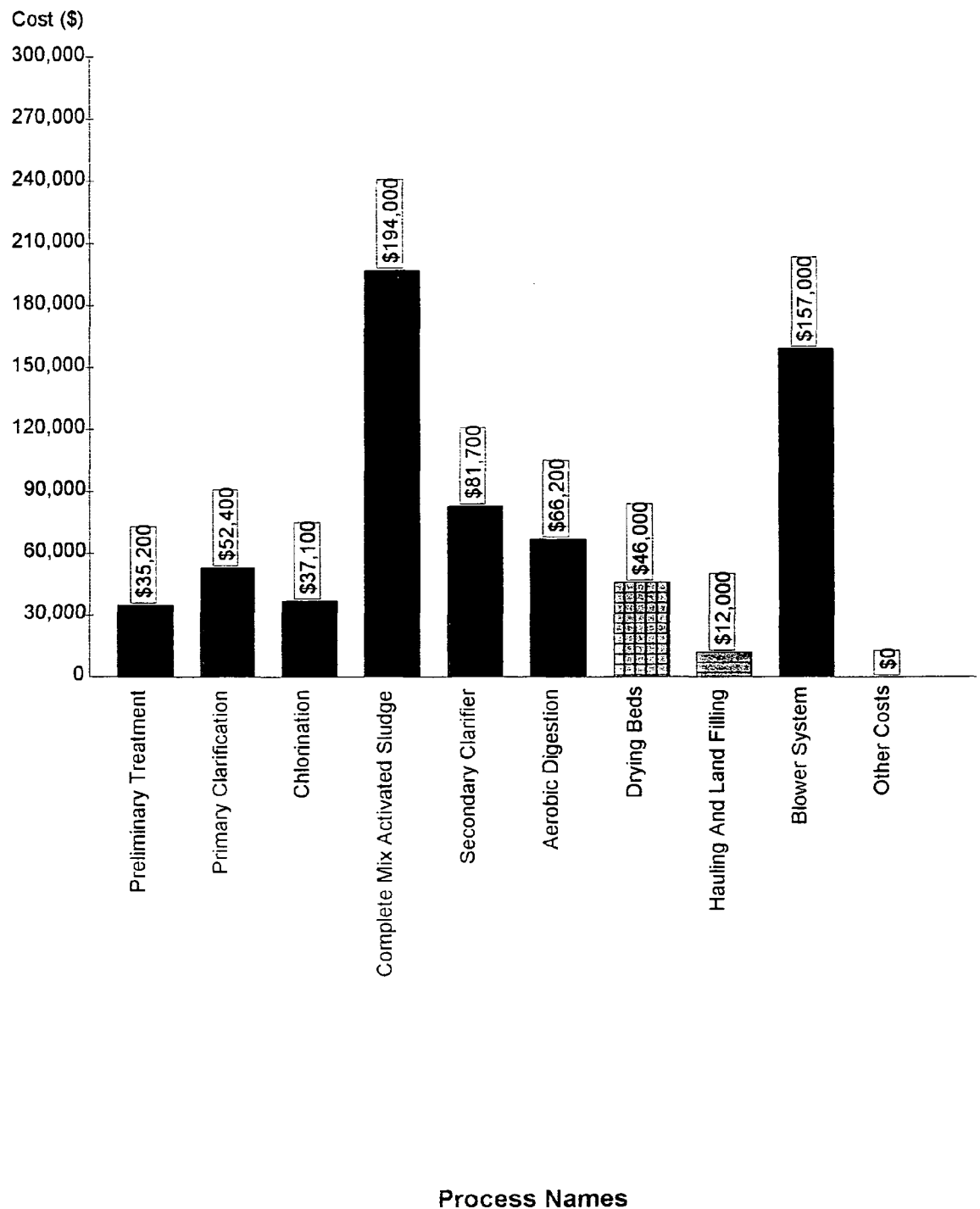
FIG. 7 is a chart of the typical amortization costs of the wastewater treatment plant described in FIG. 1.

FIG. 7 is a chart of the typical amortization costs of the wastewater treatment plant described in FIG. 1 assuming 8% per annum. The above costs assume a Marshall and Swift index of 1080, an Engineering News Research Index of 6240, Pipe Cost Index of 547, user cost index 1 of 100, user cost index 2 of 100, and user cost index 3 of 100

Figure 8:
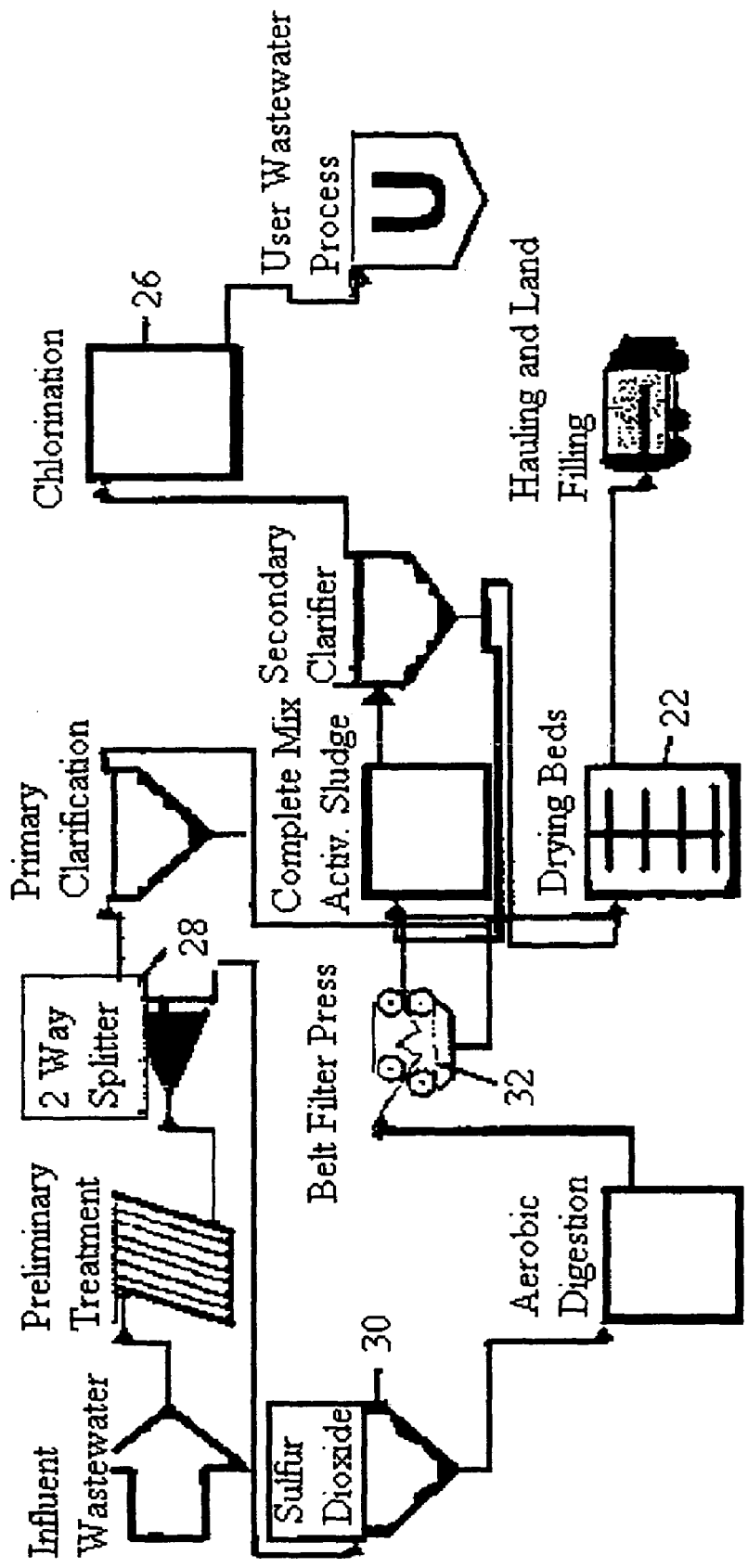
FIG. 8 illustrates the conventional mechanical sludge concentration wastewater treatment plant of FIG. 1 combined with chemical dewatering equipment.

FIG. 8 illustrates the conventional mechanical sludge concentration wastewater treatment plant of FIG. 1 combined with chemical dewatering equipment to meet an anticipated 0.5 MGD/year influent increase. Rather than incur the costs of doubling the capacity of the conventional 10 MGD plant, to determine if a hybrid mechanical/the chemical dewatering wastewater treatment system can be sized and designed, a sample of the incoming sewage influent is chemically treated with SO2 gas to determine if it will also chemically separate and dewater. As part of this testing process, the time of initial separation is also determined. This generally is approximately 20 minutes to one half hour after thorough admixing of the SO2 gas to reduce its pH to approximately 2 for disinfection. The amount of SO2 gas to acidify the wastewater to a pH of approximately 2.2 is then measured (For purposes of illustration, 2000 mg/liter is assumed under a worst case alkaline scenario).

An SO2 gas injection and mixing system is then sized to deliver the amount of gas required. To meet this 0.5 MGD/year demand, modular units are added in phases as needed. Their unit cost is well within the average construction cost of $2.6 M/1 MGD ($26.3M/10MGD) for the illustrated conventional treatment.

The screened inflows from the bar screens 12 are divided via a splitter 28 to direct a portion of the screen through the present plant layout and a portion for chemical dewater. In the example shown in FIG. 8, multiple treatment reaction vessels 32 sized to provide one half hour dwell time receive the screened influent. (For a 1 MGD double treatment capacity, the vessels must have a combined capacity of 1 MGD/24 hr/D/2 treatments/hr/0.1333686 cu.ft/gal=a combined vessel capacity of approximately 20,833 gallons). Preferably multiple treatment reaction vessels 30 are employed so while one is filling, one is on standby for filling, and two in reserve. The treatment reaction vessels 30 are preferably acid resistant, and can withstand internal stirring. Assuming a cost of $50,000/installed vessel, results in a cost of $200,000.00 for installation of four treatment reaction vessels 30. The cost of piping and pumps (not shown) to fill and drain these reaction vessels is approximately $250,000.00.

Tanked gaseous SO2 is stored and periodically delivered to the site as needed and connected to the gas injectors so minimal site preparation of $10,000 is required. The SO2 gas is associated with a mixer, such as a gas sulphonator with stirrer, or gas jet mixing equipment. The mixer injects gaseous SO2 into the wastewater enclosed in the treatment vessel. Thorough blending for approximately 20 minutes is allowed to effect separation of the solids from the liquids and acid leach heavy metals and phosphates into the liquid fraction. Gas injectors and mixers (not shown) associated with the treatment reaction vessels 30 is included in the approximate budget of $50,000/vessel for a total of $200,000.00 as SO2 is an extremely hydrophilic gas, which readily hydrolyzes without a lot of mixing.

For chemically treating the 0.5 MGD wastewater, under a worst case scenario, requires 2,204.6229 pounds/day or approximately 1 ton of sulfur dioxide at around $230/ton. For a year, the cost of SO2 would be approximately $84,000.00. If this chemically treated wastewater has to be neutralized before discharge, a ton of lime at 18 cents a pound would be required totaling $131,400/year. If elevating the pH for metals separation is further required, another ton of lime would be required under a worst-case scenario for an additional $131,400/year.

As the chemical addition, mixing, and mechanical separation steps are similar to those employed in the existing plant, no extraordinary operating costs would be incurred.

A solids separator costing approximately the same as the primarily clarifier 14 of the conventional wastewater treatment system was assumed although the SO2 treated sludge is self adhering enabling the usage of less costly larger pored screening mesh for the initial separation. The screening required is tested utilizing filters of different porosities for determining the required weave of polypropylene sheeting. Alternatively, the sheet weave of a typical cotton sheet is usually sufficient to separate the chemically separated and dewatered solids. If the cotton sheet does not have the solids adhere to it, a self-agglomerating sewage is present. Self-agglomerating treated sewage requires minimal screening and can be separated with a polypropylene disposable bag. In short, various sized and types of porous sheeting may be employed to ultimately determine the porosity required for simple separation; thereby avoiding the need for a more expensive conventional belt press or mechanical separator.

After SO2 separation, the treatment reaction vessels 30 are drained into a belt press 32 budgeted under a worst case scenario to handle up to 10 MDG flows at $577,000 to provide additional separation capacity for future expansion. This belt press 32 removes the solids from the liquids of the chemically treated separated liquid/solid mixture. The solids are then delivered to the existing drying beds for further dewatering and ultimate landfill disposal on a reduced volume/weight basis. Thus a hybrid chemical/mechanical wastewater dewatering system can be added within the $2.6M/1MGD budget constraints based on the average per unit cost of a conventional treatment plant. This is possible as construction times for the chemical dewatering equipment installation are only 6 months because the size of the units required are approximately $1/50^{th}$ to $1/100^{th}$ of that required for wastewater treatment technologies such as that shown employing conventional 24 to 48 hour sedimentation and mechanical separation techniques.

If heavy metals and phosphate removal is required, the cost of liming and adding another belt press to remove the heavy metal hydroxide/phosphate cake is comparable to a conventional alum feed system costing $148,000, when overall materials and chemical costs are considered. Instead of adding alum, the acidified chemically treated wastewater is pH adjusted via the addition of anhydrous or hydrous lime to precipitate the heavy metals as metal hydroxides and insoluble calcium phosphates from the treated wastewater stream. These metal hydroxides are then separated using mechanical separation means. This liming step provides an added benefit of heavy metals removals at a cost comparable to that of adding phosphate removal equipment.

The wastewater control splitter 28 installed after the preliminary bar screens 12 continues to direct the desired volume through the existing plant to optimize its existing operations (as influent wastewater volume generally fluctuates with the regional seasonal precipitation, there is often excess capacity in the existing mechanical wastewater treatment plant during off-peak inflows). Consequently, the splitter 28 continues to direct the optimal inflows through the existing plant and only diverts the excess capacity required for chemical dewatering; thereby optimization use of the present mechanical system, and reducing the volume required for chemical dewatering. Alternatively, the optimal flow into the existing plant may be set at less than full capacity, depending upon the age of the existing plant, temperature, equipment design, influent fluctuations, etc. if chemical dewatering is more cost efficient.

The chemically treated solids remain in the drying beds 22 for continued draining of the chemically separated solids. The chemically separated solids continue to shed water for a period of 12 to 24 hours to achieve a consistency, water and BTU content similar to wood; providing up to a 30% reduced weight, which lowers hauling and landfill costs proportionately. The collected water derived from the drying beds 22 may be land applied, sold, or reinjected into a compatible segment of the conventional wastewater treatment plant. For example, if the concentration of heavy metals and phosphates are not significant, the SO2 acidified chemically treated water from the chemical reaction vessel 30 and drying beds can be combined with that effluent from the chlorinator 24 to remove chlorine contained therein before delivery to the end user as shown in FIG. 8, thus avoiding the cost of additional chlorine removal costs.

As outlined above, the supplemental water benefits, reduced sludge disposal costs, inactivation of pharmaceuticals and chemicals, and reduced size of the reaction vessels, and heavy metals removal provides a blended wastewater treatment cost from this hybrid chemical/mechanical dewatering wastewater treatment plant, which is competitive with other conventional wastewater treatment costs.

Factors Affecting Proportionate Chemical/Mechanical Treatment Site Constraints One of the biggest problems in designing additional capacity for an existing plant is its footprint and land available for expansion. Oftentimes, there is not sufficient area for expansion of an existing plant to employ the same wastewater treatment technology. Consequently, wastewater treatment technology utilizing less area is dictated. Where land is tight, more chemical dewatering of wastewater is employed.

Existing Plant Capacity

The present plant capacity to handle future treatment demands may be limited by outmoded design or deteriorating infrastructure. If the present plant's wastewater treatment capabilities are declining, larger amounts of influent may be required to be diverted for chemical dewatering.

Eutrophication

Eutrophication discharge requirements may mandate the proportion of either phosphate or heavy metals removal from the plant effluent via chemical dewatering and subsequent removal of the metals and phosphates via pH adjustment. For example, if the effluent must be reduced by 50%, up to one half of the plant influent may be required to be chemically dewatered and pH adjusted to remove the heavy metals. Lesser amounts of the demetalized phosphate reduced fraction may be added to the existing wastewater effluent to dilute the same to meet eutrophication discharge requirements.

Permitting Constraints

Although wastewater treatment cost is a significant factor in plant design, more often permitting constraints are dominant. A large new plant addition may trigger new source review, whereas the simple addition of equipment to an existing plant to create a hybrid chemical/mechanical dewatering system requires fewer permits. The hybrid chemical/mechanical dewatering invention also provides an alternative treatment method to meet land application standards. If the heavy metals and phosphates from the influent wastewater are too concentrated for direct land application, these are first removed from the SO2 treated liquid fraction via a liming process creating a metal cake, which is then separated from the liquids. This alkaline demetalized water may then be injected into the desired segment of the pre-existing treatment plant, or acidified with more SO2 before land application.

Odor controls may also require that the treated wastewater be disinfected to prevent purification while at the wastewater treatment plant. As the chemically treated portion of the wastewater is disinfected in the treatment process, odor emissions from this fraction are minimized. Larger amounts of diverted water may therefore be required to be chemically treated to meet odor standards.

Changing Influent Composition

If there are changes in the composition of the treatment plant inflows, rendering the pre-existing mechanically separated wastewaters ineffective, but chemical separation remains effective, more of the inflows are then directed for chemical dewatering.

Disposal Constraints

For landfills with limited capacity, it may be required to divert more wastewater for chemical dewatering to reduce the volume of treated solids to extend the life of the landfill. The chemically treated solids are first disposed of in the sludge drying beds for further dewatering from 30% to 40% to 1% to 4%; thereby resulting in reduced tonnage for land filling. If this landfill constraint becomes dominant, on-site disposal via burning or gasification of the treated solids may dictate that a higher portion of the wastewater be chemically treated to produce a wood like high BTU fuel, which can be used to generate electricity or heat for process via conventional boilers and generators.

Energy Needs

Where a conventional plant requires significant heating or energy usage, it may be necessary to direct a greater portion of the wastewater influent for chemical dewatering to generate a wood like high BTU fuel to meet these energy requirements.

Community Preferences

Expanding communities near wastewater treatment ponds may place a high value on reducing their usage and footprint. This would dictate dewatering a higher portion of the influent for chemical dewatering to limit the usage of open settling ponds. Not only are these sewage treatment lagoons unaesthetic, they attract birds, which can create bird strike hazards near airports. A communities safety needs and preferences may therefore dictate that a larger portion of the wastewater influent be diverted for chemical dewatering than would be justified by cost factors alone.

Expansion Time Limits

The time of construction required to construct conventional facilities to meet additional treatment capacity required may not be sufficient. The employment of the more quickly installed chemical dewatering equipment for treatment of a higher volume of influent wastewater would therefore be dictated.

Water Revenues

The hybrid chemical/mechanical separation process provides additional water for sale or reuse by more complete dewatering of the treated solids and minimal evaporation losses because of the rapid process times. Use of enclosed vessels and reduced treatment time is the key to reducing evaporation water loss. This additional water may be sold or used in process to meet the plant's overall permitting discharge constraints.

To adapt the hybrid chemical/mechanical wastewater treatment plant to these changing and conflicting permitting and operating requirements, an adjustable variable flow splitter is employed so that the amount of wastewater influent to be chemically dewatered may be periodically adjusted to meet the needs of the community being served without completely redesigning the plant. If more chemically dewatering is required, additional modular equipment may be periodically added without having to significantly alter the plant's footprint.

Pharmaceutical and Chemical Removal

A side benefit from the treatment plant and method discussed above employing rapid sludge chemical dewatering technology in conjunction with slower conventional mechanical dewatering solids agglomeration and disposal methods is that the oxidation reduction acidification alkalinity cycle inactivates and removes pharmaceuticals and other contaminants entering sewage treatment plants to meet environmental permitting restrictions and siting limitations for disposal of sewage and wastewater.

In summary, the invention provides a sewage treatment plant and method employing rapid sludge chemical dewatering technology in conjunction with slower conventional mechanical dewatering solids agglomeration and disposal methods to meet cost, environmental permitting restrictions and other siting and permitting limitations for disposal of sewage and wastewater.

Although this specification has made reference to the illustrated embodiments, it is not intended to restrict the scope of the claims. The claims themselves recite those features deemed essential to the invention.

I claim:
1. A hybrid chemical/mechanical dewatering sewage treatment method for inactivating and removing pharmaceuticals in wastewater inflow streams and/or wastewater treatment plant process liquid streams comprising:
   a. diverting and oxygenating a portion of the wastewater inflow streams and/or conventional process liquid streams, not previously oxygenated, to oxidize chemical species including pharmaceuticals, which are inactivated by oxidation wherein the portion is greater than 0% and up to 100%;
   b. injecting $SO_2$ into the portion of wastewater inflows at a pH that generates sufficient sulfurous acid with free $SO_2$ to condition solids and wastewater for disinfection, separation, and to deodorize the separated wastewater inflows, and suppress $CO_2$ emissions and destroy those chemical species including pharmaceuticals, which are inactivated by sulfurous acid reduction;
   c. holding the sulfur dioxide treated wastewater in the same vessel into which the sulfur dioxide was injected, or a separate detention vessel, at a pH between approximately 1.5 and 4.5, depending upon dwell time, until at least one of the following occur:
      i. a conditioned wastewater is produced where suspended solids agglomerate and dewater by shedding water upon separation and drying,
      ii. dissolved solids and ammonia are sulfurous acid treated resulting in odor reduction,
      iii. $CO_2$ microbial production ceases,
      iv. required effluent disinfection occurs to meet disinfection discharge permit limits,
      v. perchlorate, chlorate, and other chemical species present in the wastewater, which have not been inactivated by contact with carbon in the solids, are inactivated by sulfurous acid reduction;
   d. mechanically separating and disposing of any solids from the wastewater inflow streams and/or process liquid streams from its chemically treated liquid fraction in accordance with a wastewater treatment plant's disposal permit requirements,
   e. raising the pH of the chemically treated liquid fraction to inactivate chemicals including pharmaceuticals that are inactivated by a pH in excess of 8, and
   f. lowering the pH of the chemically treated liquid fraction for discharge in accordance with a wastewater treatment plant's discharge permit requirements.

2. A wastewater treatment method according to claim 1, including identifying any remaining pharmaceuticals and chemical contaminants remaining in the chemically treated liquid fraction, adding reducing and oxidation agents, and repeating steps a through c.

3. A wastewater treatment method according to claim 2, wherein, hydrogen peroxide is added to the chemically treated liquid fraction to inactivate chemicals including pharmaceuticals, which require added oxidation for inactivation.

4. A wastewater treatment method according to claim 2, wherein, a ferrous ion solution is added to the chemically treated liquid fraction to inactivate chemicals including pharmaceuticals, which require added reduction for inactivation.

5. A wastewater treatment method according to claim 1, wherein the separated chemically treated solids are land filled, gasified, or burned.

6. A wastewater treatment method according to claim 1, wherein heavy metals are removed from the chemically treated liquid fraction via alkalization precipitation to precipitate heavy metals and phosphates for removal.

7. A wastewater treatment method according to claim 6, wherein hydrated or anhydrous lime is used to precipitate heavy metals for removal producing a demetalized chemically treated water for addition to mechanically separated wastewater streams to dilute its heavy metal content or land application for promoting plant growth.

8. A wastewater treatment method according to claim 6, wherein the chemically treated liquid fraction and mechanically separated wastewater stream has a combined composition such that any heavy metals will not cause eutrophication in a discharge stream.

9. A hybrid chemical/mechanical dewatering sewage treatment method for inactivating and removing pharmaceuticals in wastewater inflow streams and/or wastewater treatment plant process liquid streams comprising:
   a. selecting and designing a combined wastewater treatment system employing both mechanical and chemical concentration and dewatering technology to effectuate a combined wastewater treatment capacity of chemically treated and/or mechanical process liquid streams;
   b. determining a capacity of the wastewater stream inflows and/or process liquid streams to be chemically treated from a combined wastewater treatment system's discharge permit requirements;
   c. diverting for chemical dewatering a portion of the wastewater inflow streams and/or process liquid streams, wherein the portion to be chemically dewatered is greater than 0% and up to 100% based on at least one of the following factors:
      i. treatment costs,
      ii. site constraints for expansion,
      iii. present plant capacity to handle future treatment demands,
      iv. eutrophication discharge requirements,
      v. permitting constraints,
      vi. fluctuations in the composition of the treatment plant inflows,
      vii. landfill capacity constraints,
      viii. energy process heat requirements,
      ix. community aesthetic preferences,
      x. time of construction required to construct facilities to meet additional treatment capacity required,
      xi. treated water quality required for sale or discharge,
      xii. concentrated sludge water content required for disposal,
      xiii. odor, heavy metal and pathogen process requirements,
      xiv. chemical treatment wastewater water/solids separation times,
      xv. evaporation losses
      xvi. treatment plant $CO_2$ emissions reductions required;
      xvii. pharmaceuticals, hormones, and other organic wastewater contaminants (OWCs) present in the wastewater,
      xviii. perchlorates and chlorates and other inorganic chemical species present in the wastewater.
   d. oxygenating the diverted portion of the wastewater inflow streams and/or process liquid streams, not previously oxygenated, to oxidize those chemical species including pharmaceuticals, which are inactivated by oxidation;
   e. injecting $SO_2$ into the portion of wastewater inflows at a pH that generates sufficient sulfurous acid with free $SO_2$ to condition solids and wastewater for disinfection, separation, and to deodorize the separated wastewater inflows, and suppress $CO_2$ emissions and destroy those chemical species including pharmaceuticals, which are inactivated by sulfurous acid reduction,
   f. holding the sulfur dioxide treated separated wastewater inflows in the same vessel into which the sulfur dioxide was injected, or a separate detention vessel, at a pH between approximately 1.5 and 4.5, depending upon dwell time, until at least one of the following occur:
      i. a conditioned wastewater is produced where suspended solids agglomerate and dewater by shedding water upon separation and drying,
      ii. dissolved solids and ammonia are sulfurous acid treated resulting in odor reduction,
      iii. $CO_2$ microbial production ceases,
      iv. required effluent disinfection occurs to meet disinfection discharge permit limits,
      v. perchlorate, chlorate, and other chemical species present in the wastewater, which have not previously been inactivated by contact with carbon in the solids, are inactivated by sulfurous acid reduction;
   g. mechanically separating any sulfur dioxide treated solids and those chemical species adsorbed onto the solids from the wastewater inflow streams and/or mechanically dewatered treatment plants process liquid streams from its chemically treated liquid fraction,
   h. raising the pH of the chemically treated liquid fraction to inactive chemicals including pharmaceuticals that are inactivated by an elevated pH in excess of 8,
   i. disposing of the separated sulfur dioxide treated solids in accordance with mechanically dewatered treatment plant disposal processes and/or discharge permit requirements in a manner to prevent exposure to the chemical species; and
   j. adjusting the pH and disposing of the chemically treated liquid fraction consistent with a treatment plant's discharge permit requirements; or by reinjecting it into compatible process liquid streams of the treatment plant in a manner which will not interfere with any aerobic and anaerobic digesters to prevent the killing of helpful bacteria within the digesters, and/or adversely affect discharge permit requirements.

10. A hybrid chemical/mechanical dewatering sewage treatment method according to claim 9, wherein separated chemically treated solids are land filled, gasified, or burned in a manner to prevent exposure to pharmaceuticals in the solids.

11. A hybrid chemical/mechanical dewatering sewage treatment method according to claim 9, wherein separated chemically treated solids are admixed with mechanically separated solids in a ratio, which provide a fuel with a reduced overall moisture content than that of mechanically separated solids.

12. A hybrid chemical/mechanical dewatering sewage treatment method according to claim 9, including removal of heavy metals from the chemically treated liquid fraction via alkalization precipitation to precipitate heavy metals and phosphates for removal, and adding the reduced heavy metal and phosphate chemically treated wastewater to mechanically separated wastewater streams for dilution to comply with discharge permit requirements.

13. A hybrid chemical/mechanical dewatering sewage treatment method according to claim 9, wherein the portion of the chemically treated liquid fraction is treated with calcium or potassium hydroxide to precipitate heavy metals contained therein for removal, producing a demetalized chemically treated water for addition to mechanically separated wastewater streams to dilute its heavy metal content.

14. A hybrid chemical/mechanical dewatering sewage treatment method according to claim 9, wherein the chemically treated liquid fraction and mechanically separated wastewater stream has a composition such that any heavy metals will not cause eutrophication in a discharge stream.

* * * * *